(12) United States Patent
Gwon et al.

(10) Patent No.: US 12,619,332 B2
(45) Date of Patent: May 5, 2026

(54) TOUCH SENSOR AND TOUCH DISPLAY DEVICE WITH COIL SHAPE ELECTRODES

(71) Applicant: LG Display Co., Ltd., Seoul (KR)

(72) Inventors: Hyangmyoung Gwon, Paju-si (KR); JiHyun Jung, Paju-si (KR); SuChang An, Paju-si (KR); JaeGyun Lee, Paju-si (KR); Ruda Rhe, Paju-si (KR); Jeonghoon Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/990,174

(22) Filed: Dec. 20, 2024

(65) Prior Publication Data

US 2025/0271966 A1      Aug. 28, 2025

(30) Foreign Application Priority Data

Feb. 23, 2024      (KR) ........................ 10-2024-0026315

(51) Int. Cl.
*G06F 3/041* (2006.01)
*G06F 3/044* (2006.01)

(52) U.S. Cl.
CPC ........ *G06F 3/04182* (2019.05); *G06F 3/0412* (2013.01); *G06F 3/04164* (2019.05); *G06F 3/041662* (2019.05); *G06F 3/0445* (2019.05); *G06F 3/0446* (2019.05); *G06F 2203/04106* (2013.01); *G06F 2203/04111* (2013.01)

(58) Field of Classification Search
CPC .............. G06F 3/0412; G06F 3/04164; G06F 3/041662; G06F 3/04182; G06F 3/0445; G06F 3/0446; G06F 3/0448; G06F 2203/04106; G06F 2203/04108; G06F 2203/04111
See application file for complete search history.

(56) References Cited

U.S. PATENT DOCUMENTS

| | | | |
|---|---|---|---|
| 7,202,859 B1 * | 4/2007 | Speck ................... | G06F 3/0446 |
| | | | 345/173 |
| 2010/0193258 A1 * | 8/2010 | Simmons ............ | G06F 3/04166 |
| | | | 178/18.06 |
| 2014/0028926 A1 * | 1/2014 | Jiang ................... | G02F 1/13338 |
| | | | 349/12 |
| 2014/0210784 A1 * | 7/2014 | Gourevitch ........... | G06F 3/0443 |
| | | | 345/174 |
| 2015/0193047 A1 * | 7/2015 | Hoshtanar ............ | G06F 3/0446 |
| | | | 345/174 |
| 2018/0046290 A1 * | 2/2018 | Song ..................... | G06F 3/0412 |
| 2021/0181898 A1 * | 6/2021 | Chen ..................... | G06F 3/0412 |
| 2021/0373710 A1 * | 12/2021 | Ma ........................ | G06F 3/0412 |
| 2022/0107707 A1 * | 4/2022 | Bang ..................... | G06F 3/0445 |

* cited by examiner

*Primary Examiner* — Liliana Cerullo
(74) *Attorney, Agent, or Firm* — Fenwick & West LLP

(57) ABSTRACT

A touch display device may include a plurality of vertical electrode lines each extending in a column direction, a plurality of horizontal electrode lines each extending in a row direction, and a plurality of unit sensor areas where the plurality of vertical electrode lines and the plurality of horizontal electrode lines intersect. The plurality of unit sensor areas may include a first unit sensor area where a first vertical electrode line among the plurality of vertical electrode lines and a first horizontal electrode line among the plurality of horizontal electrode lines intersect, and, in the first unit sensor area, each of the first horizontal electrode line and the first vertical electrode line may have a coil shape.

20 Claims, 16 Drawing Sheets

TOUCH SENSOR AND TOUCH DISPLAY DEVICE WITH COIL SHAPE ELECTRODES

CROSS REFERENCE TO RELATED APPLICATION

This application claims priority from Republic of Korea Patent Application No. 10-2024-0026315, filed on Feb. 23, 2024, which is hereby incorporated by reference in its entirety.

TECHNICAL FIELD

Embodiments of the present disclosure relate to a touch sensor and a touch display device.

BACKGROUND

Recently, a touch display device capable of detecting the user's touch and providing touch-based input processing functions has been developed. In order to provide more various application functions, there has been developed a touch sensing technology utilizing a pen in addition to a finger of a user.

A touch display device may have various electrodes or lines disposed around a touch sensor in addition to the touch sensor for touch detection. This may cause coupling noise between the touch sensor and the electrodes or lines around the touch sensor. The coupling noise may be a factor deteriorating the touch sensing performance using the touch sensor.

SUMMARY

Embodiments of the present disclosure may provide a touch sensor and a touch display device with a structure capable of reducing coupling noise with other surrounding electrodes.

Embodiments of the present disclosure may provide a touch sensor and a touch display device with a structure capable of improving touch sensing performance.

Embodiments of the present disclosure may provide a touch sensor and a touch display device with a coil-type structure capable of sensing pen touch based on inductance.

Embodiments of the present disclosure may provide a touch sensor and a touch display device capable of blocking a noise on its own.

Embodiments of the present disclosure may provide a touch sensor and a touch display device with a structure enabling both capacitance-based finger touch sensing and inductance-based pen touch sensing.

A touch display device according to embodiments of the present disclosure may include a plurality of vertical electrode lines each extending in a column direction, a plurality of horizontal electrode lines each extending in a row direction, and a plurality of unit sensor areas where the plurality of vertical electrode lines and the plurality of horizontal electrode lines intersect.

In the touch display device according to embodiments of the present disclosure, the plurality of unit sensor areas may include a first unit sensor area where a first vertical electrode line among the plurality of vertical electrode lines and a first horizontal electrode line among the plurality of horizontal electrode lines intersect.

In the touch display device according to embodiments of the present disclosure, in the first unit sensor area, each of the first horizontal electrode line and the first vertical electrode line may have a coil shape.

In the touch display device according to embodiments of the present disclosure, in the first unit sensor area, each of the first horizontal electrode line and the first vertical electrode line may be interlocked with each other and wound in a coil shape.

In the touch display device according to embodiments of the present disclosure, during a pen touch sensing period, a pen signal having a first frequency and output from a pen which contacts or is close to the display panel may be applied to at least one of the plurality of horizontal electrode lines and the plurality of vertical electrode lines.

In the touch display device according to embodiments of the present disclosure, during the pen touch sensing period, a current of the first frequency may flow through at least one of the plurality of horizontal electrode lines and the plurality of vertical electrode lines.

A touch sensor according to embodiments of the present disclosure may include a plurality of first electrode lines each extending in a first direction and having a coil shape, and a plurality of second electrode lines each extending in a second direction different from the first direction and having a coil shape.

In the touch sensor according to embodiments of the present disclosure, the plurality of first electrode lines and the plurality of second electrode lines may be interlocked with each other on the same plane and wound in a coil shape.

In the touch sensor according to embodiments of the present disclosure, when a pen signal having a first frequency is input, a current having the first frequency may flow through at least one of the plurality of first electrode lines and the plurality of second electrode lines.

In the touch sensor according to embodiments of the present disclosure, a signal or a current with a frequency different from the first frequency may be blocked by the touch sensor.

According to embodiments of the present disclosure, it is possible to provide a touch sensor and a touch display device with a structure capable of reducing coupling noise with other surrounding electrodes.

According to embodiments of the present disclosure, it is possible to provide a touch sensor and a touch display device with a structure capable of improving touch sensing performance.

According to embodiments of the present disclosure, it is possible to provide a touch sensor and a touch display device with a coil-type structure capable of sensing pen touch based on inductance.

According to embodiments of the present disclosure, it is possible to provide a touch sensor and a touch display device capable of blocking a noise on its own.

According to embodiments of the present disclosure, it is possible to provide a touch sensor and a touch display device with a structure enabling both capacitance-based finger touch sensing and inductance-based pen touch sensing. Accordingly, it is possible to reduce the weight of the touch display device since there is no need to separately provide a touch sensor for finger touch sensing and a touch sensor for pen touch sensing.

DETAILED DESCRIPTION

Figure 1:
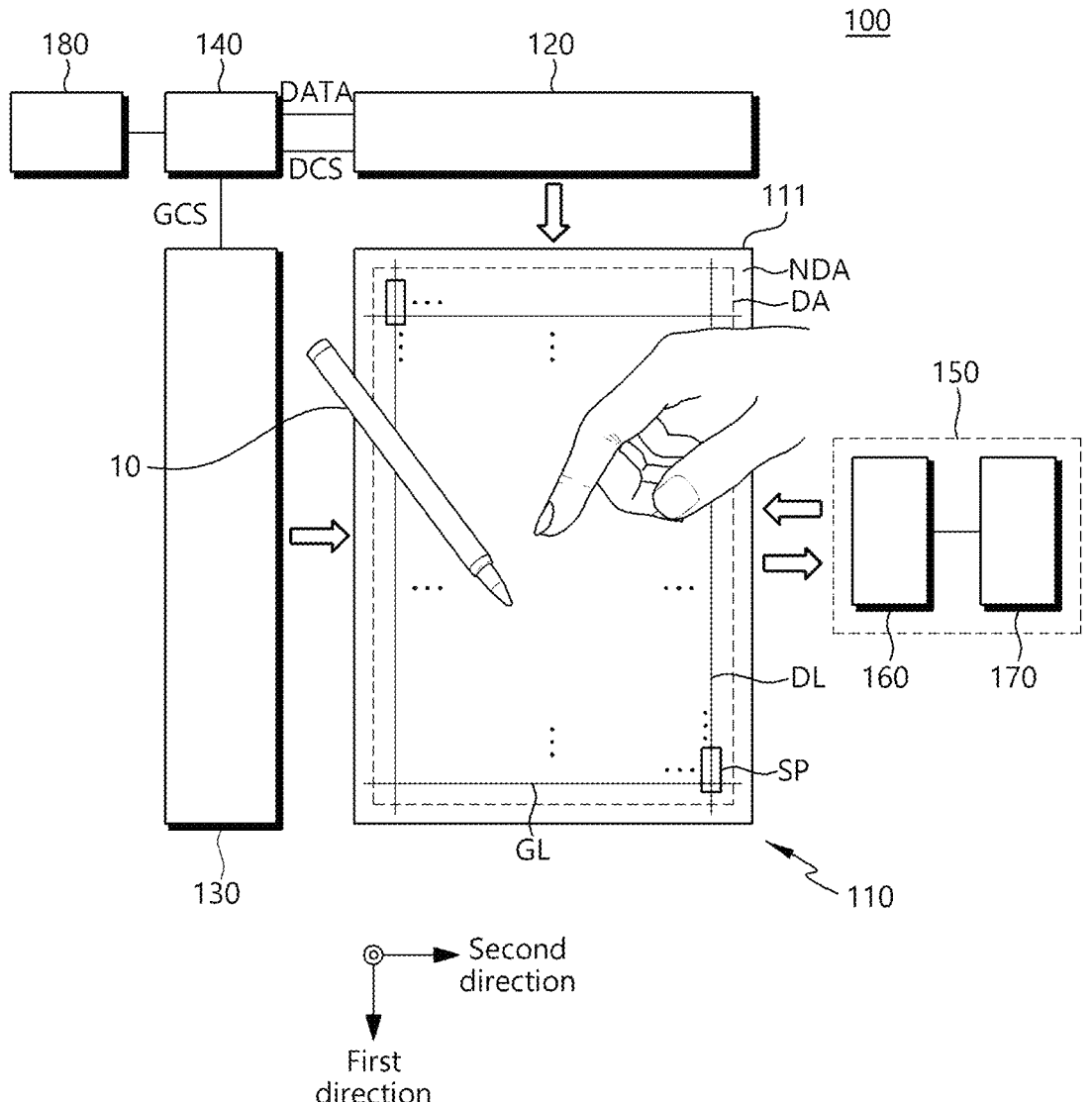
FIG. 1 is a system configuration diagram of a touch display device according to embodiments of the present disclosure.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a", "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components are not limited by the denotations.

In describing the positional relationship between components, when two or more components are described as "connected", "coupled" or "linked", the two or more components may be directly "connected", "coupled" or "linked"", or another component may intervene. Here, the other component may be included in one or more of the two or more components that are "connected", "coupled" or "linked" to each other.

When such terms as, e.g., "after", "next to", "after", and "before", are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

Hereinafter, various embodiments of the disclosure are described in detail with reference to the accompanying drawings.

FIG. 1 is a system configuration diagram of a touch display device 100 according to embodiments of the present disclosure.

Referring to FIG. 1, a touch display device 100 according to embodiments of the present disclosure may include a display panel 110 and a display driving circuit as components for displaying an image. The display driving circuit is a circuit for driving the display panel 110, and may include a data driving circuit 120, a gate driving circuit 130, and a display controller 140.

The display panel 110 may include a substrate 111, a plurality of subpixels SP disposed on the substrate 111, and a plurality of signal lines disposed on the substrate 111 and used to drive the plurality of subpixels SP.

The substrate 111 of the display panel 110 may include a display area DA capable of displaying an image and a non-display area NDA located in a first direction from the display area DA.

The non-display area NDA may include a pad area to which the data driving circuit 120 is connected. For example, the pad area may be located in the first direction from the display area DA.

The non-display area NDA may only have a size sufficient to include the pad area, etc. That is, the non-display area NDA of the display panel 110 according to the embodiments of the present disclosure may have a very small size. For example, even if the display panel 110 has the non-display area NDA, the boundary area between the display area and the non-display area NDA may be bent so that the non-display area NDA may be located below the display area DA. In this case, when the user views the touch display device 100 from the front, the non-display area NDA visible to the user may be almost or not at all.

The touch display device 100 according to embodiments of the present disclosure may be a liquid crystal display device or the like, or may be a self-luminous display device in which the display panel 110 emits light by itself. When the touch display device 100 according to embodiments of the present disclosure is a self-luminous display device, each of the plurality of subpixels SP may include a light emitting device.

For example, the touch display device 100 according to embodiments of the present disclosure may be an organic light emitting display device in which a light emitting device is implemented as an organic light emitting diode (OLED). For another example, the touch display device 100 according to embodiments of the present disclosure may be an inorganic light emitting display device in which the light emitting device is implemented as an inorganic-based light emitting diode. For another example, the touch display device 100 according to embodiments of the present disclosure may be a quantum dot display device in which a light emitting device is implemented with quantum dots, which are semiconductor crystals emitting light by itself.

The structure of each of the plurality of subpixels SP may vary depending on the type of the touch display device 100. For example, if the touch display device 100 is a self-luminous display device with the subpixel SP emitting light by itself, each subpixel SP may include a self-luminous light emitting device, one or more transistors, and one or more capacitors.

For example, various types of signal lines may include a plurality of data lines DL supplying data signals (also called data voltages or image signals) and a plurality of gate lines GL for transmitting gate signals (also called scan signals).

For example, the plurality of data lines DL and the plurality of gate lines GL may cross each other. Each of the plurality of data lines DL may be arranged to extend in a first direction. Each of the plurality of gate lines GL may be arranged to extend in a second direction. Here, the first direction may be a column direction and the second direction may be a row direction. Alternatively, the first direction may be a row direction and the second direction may be a column direction. Hereinafter, for convenience of explanation, it will exemplified a case in which each of the plurality of data lines DL is arranged in a column direction, each of the plurality of gate lines GL is arranged in a row direction, the first direction is the column direction, and the second direction is the row direction.

The data driving circuit 120 is a circuit for driving a plurality of data lines DL, and may output data signals to the plurality of data lines DL.

The data driving circuit 120 may receive image data in digital form from the display controller 140 and convert the received image data into analog data signals to output to a plurality of data lines DL.

For example, the data driving circuit 120 may be connected to the display panel 110 using a tape automated bonding (TAB) method, or may be connected to the bonding pad of the display panel 110 using a chip-on-glass (COG) or chip-on-panel (COP) method, or may be implemented using a chip-on-film (COF) method and connected to the display panel 110.

The data driving circuit 120 may be connected to the outside of the display area DA of the display panel 110, but alternatively, it may be disposed in the display area DA of the display panel 110.

The gate driving circuit 130 is a circuit for driving a plurality of gate lines GL, and may output gate signals to the plurality of gate lines GL.

The gate driving circuit 130 may receive a first gate voltage corresponding to the turn-on level voltage and a second gate voltage corresponding to the turn-off level voltage along with various gate driving control signals GCS, and may generate gate signals and supply the generated gate signals to the plurality of gate lines GL.

In the touch display device 100 according to the embodiments of the present disclosure, the gate driving circuit 130 may be disposed to overlap with the display area DA of the display panel 110. For example, the gate driving circuit 130 may be disposed over the entire display area DA, or may be disposed only in a part (e.g., both sides) of the display area DA. If the gate driving circuit 130 is arranged to overlap with the display area DA, the gate driving circuit 130 may be disposed not to overlap with the subpixels SP, or may be disposed to overlap with some or all of the subpixels SP.

In the touch display device 100 according to embodiments of the present disclosure, the gate driving circuit 130 may be built into the display panel 110 as a gate-in-panel (GIP) type. If the gate driving circuit 130 is a gate-in-panel type, the gate driving circuit 130 may be formed on a substrate of the display panel 110 during the manufacturing process of the display panel 110.

The display controller 140 may be a device for controlling the data driving circuit 120 and the gate driving circuit 130, and may control the driving timing for the plurality of data lines DL and the driving timing of the plurality of gate lines GL.

The display controller 140 may supply a data driving control signal DCS to the data driving circuit 120 to control the data driving circuit 120, and may supply a gate driving control signal GCS to the gate driving circuit 130 to control the gate driving circuit 130.

The display controller 140 may receive input image data from a host system 180 and supply image data DATA to the data driving circuit 120 based on the input image data.

The display controller 140 may be implemented as a separate component from the data driving circuit 120, or may be integrated with the data driving circuit 120 and implemented as an integrated circuit.

The display controller 140 may be a timing controller used in typical display technology, or may be a control device capable of further performing other control functions including a timing controller, or may be a control device different from the timing controller, or may be a control device other than a timing controller, or may be a circuit within the control device. The display controller 140 may be implemented with various circuits or electronic components, such as an integrated circuit (IC), a field programmable gate array (FPGA), an application specific integrated circuit (ASIC), or Processor.

The display controller 140 may be mounted on a printed circuit board, a flexible printed circuit, etc., and may be electrically connected to the data driving circuit 120 and the gate driving circuit 130 through a printed circuit board, a flexible printed circuit.

The display controller 140 may transmit and receive signals with the data driving circuit 120 according to one or more predetermined interfaces. For example, the interface may include a low voltage differential signaling (LVDS) interface, an embedded clock point-point interface (EPI) interface, or a serial peripheral interface (SPI).

In order to provide not only an image display function but also a touch sensing function, the touch display device 100 according to embodiments of the present disclosure may include a touch sensor and a touch sensing circuit 150.

The touch sensing circuit 150 may detect whether a touch (e.g., finger touch, pen touch) has occurred by a touch object such as a finger or pen 10 by sensing the touch sensor, or may detect the touch location.

The touch sensing circuit 150 may include a touch driving circuit 160 for driving and sensing a touch sensor to generate and output touch sensing data, and a touch controller 170 for detecting the occurrence of a touch or detecting the touch position using touch sensing data.

A touch sensor may include a plurality of sensor electrodes. The touch sensor may also be referred to as a touch panel or touch screen panel TSP.

The touch sensor may be an external type existing outside the display panel 110, or an internal type or a built-in type existing inside the display panel 110.

If the touch sensor is an external type, the touch sensor and the display panel 110 may be manufactured separately and combined during the assembly process. The external type touch sensor may include a substrate and a plurality of sensor electrodes on the substrate.

If the touch sensor is an internal type, a plurality of sensor electrodes may be formed together with various patterns for display driving within the display panel 110 during the manufacturing process of the display panel 110.

The touch driving circuit 160 may supply a touch driving signal to at least one of the plurality of sensor electrodes and generate touch sensing data by sensing at least one of the plurality of sensor electrodes.

The touch sensing circuit 150 may perform touch sensing using a self-capacitance sensing method or a mutual-capacitance sensing method.

If the touch sensing circuit 150 performs touch sensing using a self-capacitance sensing method, the touch sensing circuit 150 may perform touch sensing based on the capacitance between each sensor electrode and a touch object (e.g., finger, pen 10, etc.). According to the self-capacitance sensing method, each of the plurality of sensor electrodes may serve as a transmitting sensor electrode and a receiving sensor electrode. The touch driving circuit 150 may drive all or part of the plurality of sensor electrodes and sense all or part of the plurality of sensor electrodes.

If the touch sensing circuit 150 performs touch sensing using the mutual-capacitance sensing method, the touch sensing circuit 150 may perform touch sensing based on the capacitance between sensor electrodes. According to the mutual-capacitance sensing method, the plurality of sensor electrodes may be divided into a plurality of transmitting sensor electrodes and a plurality of receiving sensor electrodes. The touch driving circuit 150 may drive the plurality of transmitting sensor electrodes and sense the plurality of receiving sensor electrodes.

Hereinafter, the transmitting sensor electrode may be referred to as a driving sensor electrode, and the receiving sensor electrode may be referred to as a detecting sensor electrode.

The touch driving circuit 160 and the touch controller 170 included in the touch sensing circuit 150 may be implemented as separate devices or as one device.

In addition, the touch driving circuit 160 and the data driving circuit 120 may be implemented as separate devices or as one device. For example, the touch driving circuit 160 and the data driving circuit 120 may be configured as one integrated circuit.

The touch display device 100 may further include a power supply circuit which supplies various types of power to the display driving circuit and/or the touch sensing circuit 150.

The touch display device 100 according to embodiments of the present disclosure may be a mobile terminal such as a smart phone or tablet, or a monitor or television of various sizes, but is not limited thereto, and may be a display of various types and sizes capable of displaying information or images.

Figure 2:
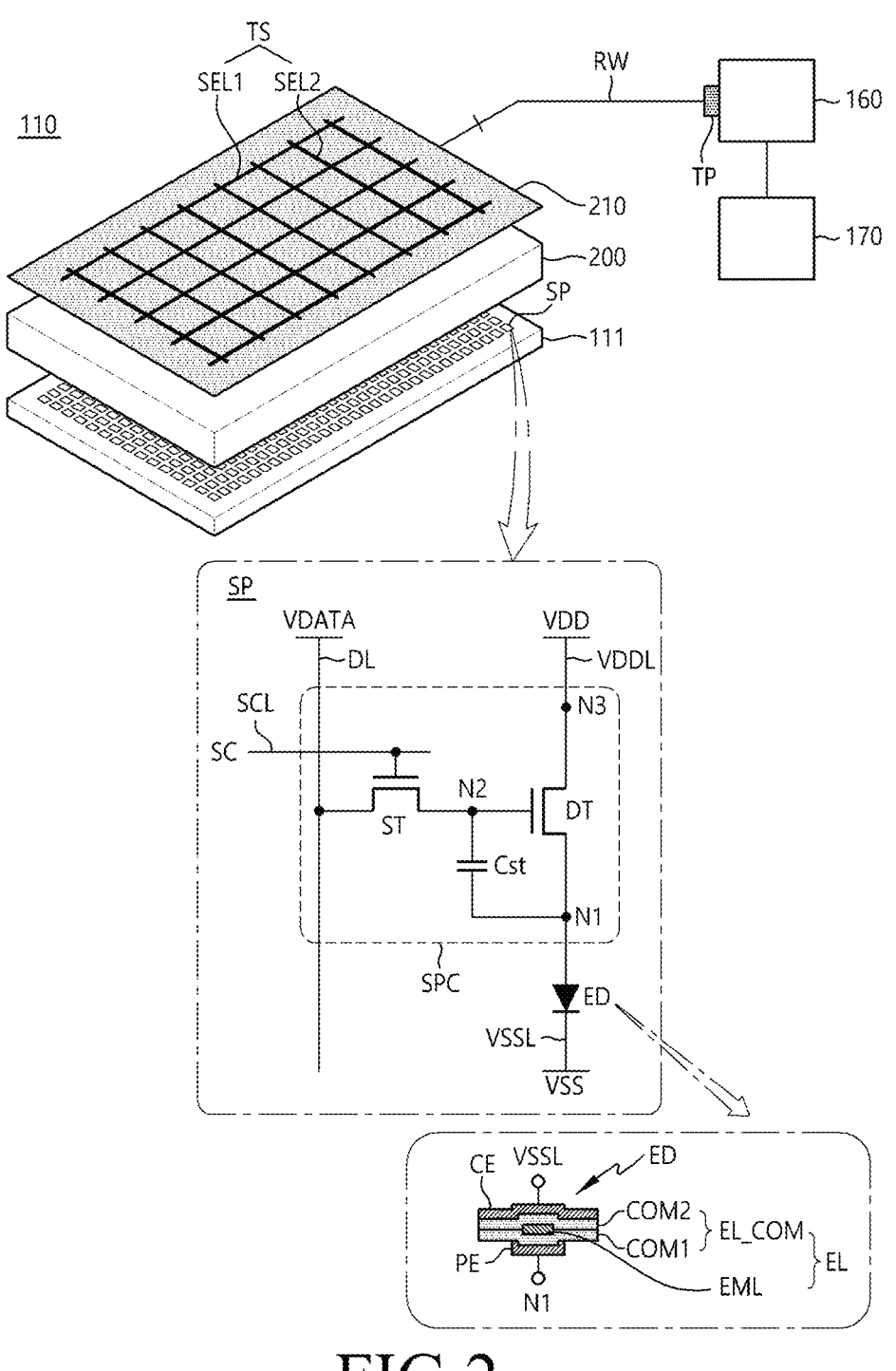
FIG. 2 illustrates a display panel of a touch display device according to embodiments of the present disclosure.

FIG. 2 illustrates a display panel 110 of a touch display device 100 according to embodiments of the present disclosure.

Referring to FIG. 2, the display panel 110 may include a substrate 111 disposed with a plurality of subpixels SP and an encapsulation layer 200 on the substrate 111. Here, the encapsulation layer 200 may also be referred to as an encapsulation substrate or an encapsulation portion.

Referring to FIG. 2, when the display device 100 according to embodiments of the present disclosure is a self-luminous display device, each of the plurality of subpixels SP may include a light emitting device ED and a subpixel circuit SPC for driving the light emitting device ED.

Referring to FIG. 2, the subpixel circuit SPC may include a plurality of transistors for driving the light emitting device ED and at least one capacitor. In the present disclosure, the subpixel circuit SPC may drive the light emitting device ED by supplying a driving current to the light emitting device ED at a predetermined timing. The light emitting device ED may be driven by a driving current and emit light.

The plurality of transistors may include a driving transistor DT for driving the light emitting device ED, and a scan transistor ST which is turned on or off depending on the scan signal SC.

The driving transistor DT may supply driving current to the light emitting device ED.

The scan transistor ST may be configured to control the electrical state of a corresponding node in the subpixel circuit SPC or to control the state or operation of the driving transistor DT.

At least one capacitor may include a storage capacitor Cst to maintain a constant voltage during the frame.

In order to drive the subpixel SP, a data signal VDATA which is an image signal, and a scan signal SC which is a gate signal may be applied to the subpixel SP. In addition, a common pixel driving voltage including a first common driving voltage VDD and a second common driving voltage VSS may be applied to the subpixel SP in order to drive the subpixel SP.

The light emitting device ED may include a pixel electrode PE, an intermediate layer EL, and a common electrode CE. The intermediate layer EL may be located between the pixel electrode PE and the common electrode CE.

For example, the pixel electrode PE may be an electrode disposed in each subpixel SP, and the common electrode CE may be an electrode disposed in common in a plurality of subpixels SP. For example, the pixel electrode PE may be an anode AND, and the common electrode CE may be a cathode CAT. Alternatively, the pixel electrode PE may be a cathode CAT and the common electrode CE may be an anode AND. Hereinafter, for convenience of explanation, it is exemplified a case where the pixel electrode PE is an anode AND and the common electrode CE is a cathode CAT.

In the case that the light emitting device ED is an organic light emitting device, the intermediate layer EL may include an emission layer EML, a first common intermediate layer COM1 between the pixel electrode PE and the emission layer EML, and a second common intermediate layer COM2 between the emission layer EML and the common electrode CE. The first common intermediate layer COM1 and the second common intermediate layer COM2 may be combined and may be referred to as a common intermediate layer EL_COM.

The emission layer EML may be disposed in each subpixel SP, and the common intermediate layer EL_COM may be disposed commonly across a plurality of subpixels SP.

The emission layer EML may be disposed in each emission area, and the common intermediate layer EL_COM may be disposed commonly across a plurality of emission area and a non-emission area.

For example, the first common intermediate layer COM1 may include a hole injection layer HIL and a hole transport layer HTL. The second common intermediate layer COM2 may include an electron transport layer ETL and an electron injection layer EIL. The hole injection layer may inject holes from the pixel electrode PE to the hole transport layer, the hole transport layer may transport holes to the emission layer EML, the electron injection layer may inject electrons from the common electrode CE to the electron transport layer, and the electron transport layer may transport electrons to the emission layer EML.

For example, the common electrode CE may be electrically connected to a second common driving voltage line VSSL. A second common driving voltage VSS, which is a type of common pixel driving voltage, may be applied to the common electrode CE through the second common driving voltage line VSSL. The pixel electrode PE may be electrically connected directly or indirectly (via another transistor) to the first node N1 of the driving transistor DT of each subpixel SP. In the present disclosure, the "second common driving voltage VSS" may also be referred to as a "base voltage", and the "second common driving voltage line VSSL" may also be referred to as a "low potential power supply voltage line" or a "base voltage line".

Each light emitting device ED may be composed of overlapping parts of the pixel electrode PE, the emission layer EML in the intermediate layer EL, and the common electrode CE. A predetermined emission area may be formed by each light emitting device ED. For example, the emission area of each light emitting device ED may include an area where the pixel electrode PE, the emission layer EML in the intermediate layer EL, and the common electrode CE overlap.

For example, the light emitting device ED may be an organic light emitting diode (OLED), an inorganic light emitting diode, or a quantum dot light emitting device. For example, in the case that the light emitting device ED is an organic light emitting diode OLED, the intermediate layer EL in the light emitting device ED may include an organic intermediate layer EL containing an organic material.

The driving transistor DT may be a driving transistor for supplying driving current to the light emitting device ED. The driving transistor DT may be connected between a first common driving voltage line VDDL and the light emitting device ED.

The driving transistor DT may include a first node N1, a second node N2, and a third node N3. The first node N1 may be electrically connected to the light emitting device ED, the second node N2 may receive a data signal VDATA, and the third node N3 may receive a first common driving voltage VDD from a first common driving voltage line VDDL.

In the driving transistor DT, the second node N2 may be a gate node, the first node N1 may be a source node or a drain node, and the third node N3 may be a drain node or a source node. Hereinafter, for convenience of explanation, it will be described a case in which the second node N2 is a gate node, the first node N1 is a source node, and the third node N3 is a drain node in the driving transistor DT. However, embodiments of the present disclosure are not limited thereto.

The scan transistor ST included in the subpixel circuit SPC illustrated in FIG. 2 may be a switching transistor for transmitting a data signal VDATA, which is an image signal, to the second node N2 which is the gate node of the driving transistor DT.

The scan transistor ST may be controlled on-off by the scan signal SC which is a gate signal applied through the scan line SCL as a type of gate line GL, and may control the electrical connection between the second node N2 of the driving transistor DT and the data line DL. The drain electrode or source electrode of the scan transistor ST may be electrically connected to the data line DL, and the source electrode or drain electrode of the scan transistor ST may be electrically connected to the second node N2 of the driving transistor DT. The gate electrode of the scan transistor ST may be electrically connected to the scan line SCL.

The storage capacitor Cst may be electrically connected between the first node N1 and the second node N2 of the driving transistor DT. The storage capacitor Cst may include a first capacitor electrode electrically connected to the first node N1 of the driving transistor DT or corresponding to the first node N1 of the driving transistor DT, and a second capacitor electrode electrically connected to the second node N2 of the driving transistor DT or corresponding to the second node N2 of the driving transistor DT.

The storage capacitor Cst may be an external capacitor intentionally designed outside the driving transistor DT rather than a parasitic capacitor (e.g., Cgs, Cgd) as an internal capacitor which may exist between the first node N1 and the second node N2 of the driving transistor DT.

Each of the driving transistor DT and the scan transistor ST may be an n-type transistor or a p-type transistor.

The display panel 110 may have a top emission structure or a bottom emission structure.

If the display panel 110 has a top emission structure, at least a portion of the subpixel circuit SPC may overlap with at least a portion of the light emitting device ED in the vertical direction. Accordingly, the area of the emission area may be increased and the aperture ratio may be increased.

If the display panel 110 has a bottom emission structure, the subpixel circuit SPC may not overlap with the light emitting device ED in the vertical direction.

As shown in FIG. 2, the subpixel circuit SPC may have 2T-1C structure including two transistors T1 and T2 and one capacitor Cst. In some case, the subpixel circuit SPC may further include one or more transistors or one or more capacitors.

For example, the subpixel circuit SPC may have a 8T-1C structure including eight transistors and a single capacitor. For another example, the subpixel circuit SPC may have a 6T-2C structure including six transistors and two capacitors. For another example, the subpixel circuit SPC may have a 7T-1C structure including seven transistors and one capacitor. However, embodiments of the present disclosure are not limited thereto.

Depending on the structure of the subpixel circuit SPC, there may vary the type and number of gate signal and/or gate lines supplied to the subpixel SP. In addition, depending on the structure of the subpixel circuit SPC, there may vary the type and number of common pixel driving voltages supplied to the subpixel SP.

Since circuit elements within each subpixel SP (in particular, light emitting devices EDs implemented with organic light emitting diodes (OLEDs) containing organic materials) are vulnerable to external moisture or oxygen, an encapsulation layer 200 may be disposed on the display panel 110 to prevent or at least reduce oxygen from penetrating into the circuit elements (particularly, the light emitting device ED). The encapsulation layer 200 may be configured in various shapes to prevent the light emitting device ED from coming into contact with moisture or oxygen.

Referring to FIG. 2, in order to sense a touch of a user, the touch display device 100 according to embodiments of the present disclosure may include a touch sensor TS. The touch sensor TS may exist outside the display panel 110, or may be built into the display panel 110. Hereinafter, it will be described as an example a case where the touch sensor TS according to embodiments of the present disclosure is built into the display panel 110. However, the embodiments of the present disclosure are not limited thereto.

Referring to FIG. 2, the display panel 110 of the touch display device 100 according to embodiments of the present disclosure may further include a touch sensor layer 210 on which the touch sensor TS is disposed in order to sense a user's touch.

The touch sensor TS may include a plurality of first electrode lines SEL1 each extending in a first direction (e.g., column direction) and a plurality of second electrode lines SEL2 each extending in a second direction (e.g., row direction).

The touch driving circuit 160 may drive and sense the touch sensor TS. The touch controller 170 may determine an occurrence of a touch or the touch coordinates by using the sensing result (e.g., sensing data) of the touch driving circuit 160.

The touch sensor layer 210 may be built into the display panel 110. For example, the touch sensor layer 210 may be disposed on the encapsulation layer 200 in the display panel 110.

The display panel 110 may further include a plurality of touch pads TP to which the touch driving circuit 160 is electrically connected, and a plurality of routing wires RW for electrically connecting the touch sensor TS to the plurality of touch pads TP.

Figure 3:
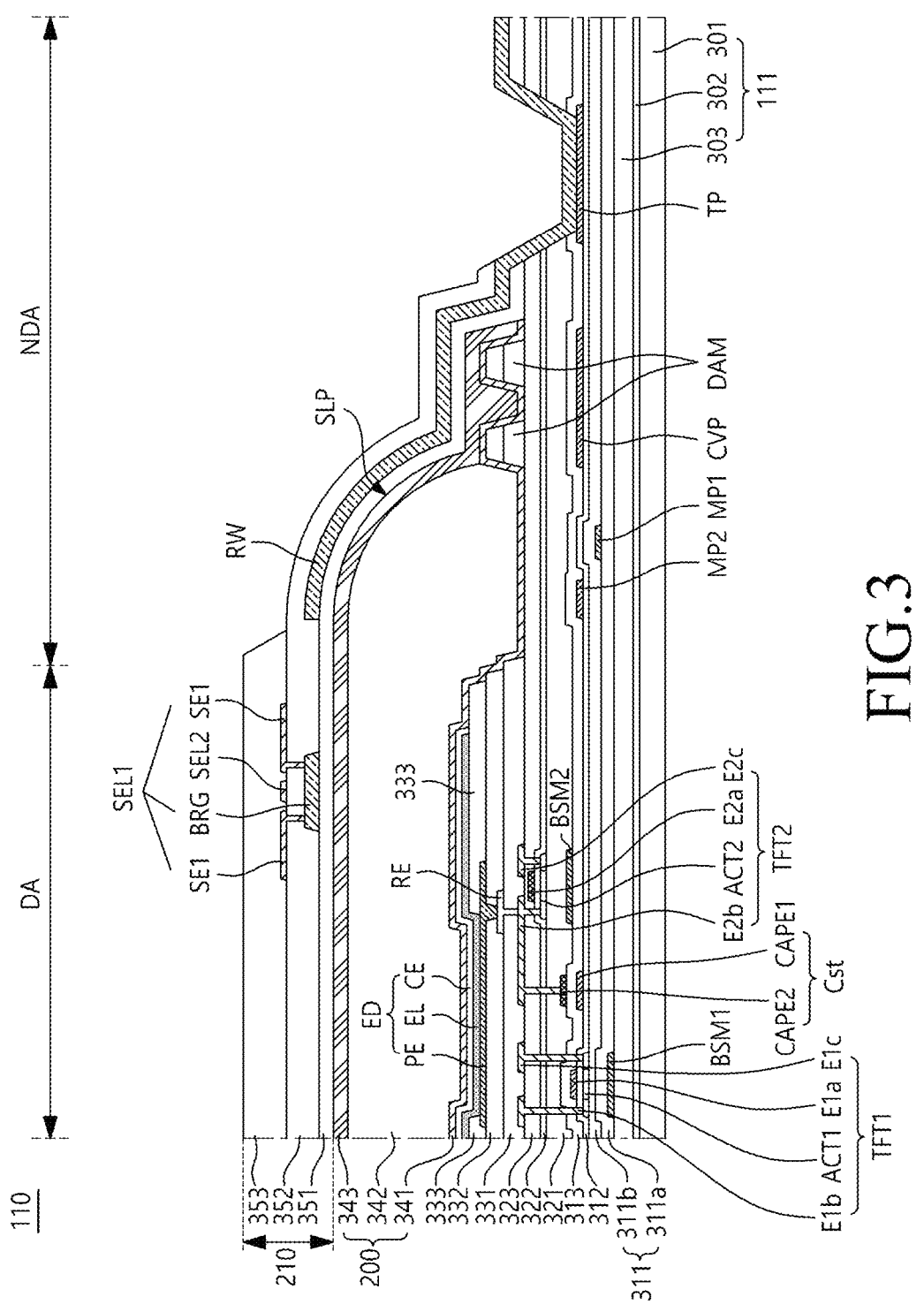
FIG. 3 is a cross-sectional view of a display panel according to embodiments of the present disclosure.

FIG. 3 is a cross-sectional view of a display panel 110 according to embodiments of the present disclosure.

Referring to FIG. 3, the display panel 110 according to the embodiments of the present disclosure may include a transistor formation portion, a light emitting device formation portion, and an encapsulation portion in terms of a vertical structure.

The substrate 111 may be a single layer or a multilayer. If the substrate 111 is a multilayer, the substrate 111 may include a first substrate 301, a substrate intermediate layer 302, and a second substrate 303. The substrate intermediate layer 302 may be located between the first substrate 301 and the second substrate 303. For example, each of the first substrate 301 and the second substrate 303 may be a polyimide (PI) layer. The substrate intermediate layer 302 may be an inorganic insulating layer. The substrate intermediate layer 302 may block the charge from affecting the transistors disposed on the second substrate 303 through the second substrate 303, which is a polyimide layer, when the charge is charged on the first substrate 301 which is a polyimide layer.

In addition, the substrate intermediate layer 302 may block moisture components from penetrating upward through the first substrate 301. For example, the substrate intermediate layer 302 may be formed of a single layer of silicon nitride (SiNx) or silicon oxide (SiOx), or a multilayer thereof, and may also be formed of a double layer of silicon dioxide (SiO2) and silicon nitride (SiNx), but is not limited thereto.

The transistor formation portion may include a substrate 111, a plurality of insulating layers 311, 312, 313, 321, 322 and 323 on the substrate 111, a plurality of transistors TFT1 and TFT2, a storage capacitor Cst, and a plurality of electrodes or signal lines.

The transistors TFT1 and TFT2 included in the transistor formation portion may include a first transistor TFT1 and a second transistor TFT2.

The first transistor TFT1 may include a first active layer ACT1, a first electrode E1a, a second electrode E1b, and a third electrode E1c. The first active layer ACT1 may be a first semiconductor layer, but the embodiments of the present disclosure are not limited thereto. For example, the first active layer ACT1 may be composed of oxide semiconductor, amorphous silicon, polysilicon, or low-temperature polysilicon (LTPS), but the embodiments of the present disclosure are not limited thereto. The first transistor TFT1 may be implemented as a p-channel transistor or an n-channel transistor, but the embodiments of the present disclosure are not limited thereto.

The first electrode E1a may be a gate electrode, the second electrode E1b may be a source electrode or a drain electrode, and the third electrode E1c may be a drain electrode or a source electrode. Hereinafter, for convenience of explanation, the first electrode E1a is referred to as a first gate electrode E1a, the second electrode E1b is referred to as a first source electrode E1b, and the third electrode E1c is referred to as a first drain electrode E1c. However, the embodiments of the present disclosure are not limited thereto.

The second transistor TFT2 may include a second active layer ACT2, a fourth electrode E2a, a fifth electrode E2b, and a sixth electrode E2c. The second active layer ACT2 may be a second semiconductor layer, but embodiments of the present disclosure are not limited thereto. For example, the second active layer ACT2 may be composed of an oxide semiconductor, amorphous silicon, polysilicon, or low-temperature polysilicon (LTPS), but embodiments of the present disclosure are not limited thereto. The second transistor TFT2 may be implemented as a p-channel transistor or an n-channel transistor, but embodiments of the present disclosure are not limited thereto.

For example, one of the first transistor TFT1 and the second transistor TFT2 may be configured with an oxide semiconductor as an active layer. For another example, one of the first transistor TFT1 and the second transistor TFT2 may be configured with low-temperature polysilicon as an active layer. For another example, the first transistor TFT1 and the second transistor TFT2 may be configured with an oxide semiconductor as an active layer. For another example, the first transistor TFT1 and the second transistor TFT2 may be configured with low-temperature polysilicon as an active layer. For another example, a driving transistor DT among the first transistor TFT1 and the second transistor TFT2 may be configured with an oxide semiconductor as an active layer, and a scan transistor ST may be configured with low-temperature polysilicon as an active layer. For another example, among the first transistor TFT1 and the second transistor TFT2, the driving transistor DT may be configured with low-temperature polysilicon as an active layer, and the scan transistor ST may be configured with an oxide semiconductor as an active layer. For another example, the transistor included in the gate driving circuit 130 of the gate-in-panel (GIP) type may be configured with an oxide semiconductor or low-temperature polysilicon as an active layer. For another example, all the transistors configured on the substrate 111 and the transistor included in the gate driving circuit 130 of the gate-in-panel (GIP) type may be configured with an oxide semiconductor as an active layer.

The fourth electrode E2a may be a gate electrode, the fifth electrode E2b may be a source electrode or a drain electrode, and the sixth electrode E2c may be a drain electrode or a source electrode. Hereinafter, for convenience of explanation, the fourth electrode E2a is also referred to as a second gate electrode E2a, the fifth electrode E2b is also referred to as a second source electrode E2b, and the sixth electrode E2c is also referred to as a second drain electrode E2c. However, the embodiments of the present disclosure are not limited thereto.

The second active layer ACT2 of the second transistor TFT2 may be located higher from the substrate 111 than the first active layer ACT1 of the first transistor TFT1.

A first buffer layer 311 may be disposed under the first active layer ACT1 of the first transistor TFT1, and a second buffer layer 321 may be disposed under the second active layer ACT2 of the second transistor TFT2. For example, the first active layer ACT1 of the first transistor TFT1 may be located on the first buffer layer 311, and the second active layer ACT2 of the second transistor TFT2 may be positioned on the second buffer layer 321. The second buffer layer 321 may be located higher than the first buffer layer 311.

The storage capacitor Cst may be disposed within various metal layers within the display panel 110, for example, the storage capacitor Cst may include a first capacitor electrode CAPE1 and a second capacitor electrode CAPE2.

The light emitting device formation portion may include a plurality of light emitting devices ED disposed on at least one planarization layer 331 and 332. Each of the plurality of light emitting devices ED may include a pixel electrode PE, an intermediate layer EL, and a common electrode CE.

The encapsulation portion may include an encapsulation layer 200 on the plurality of light emitting devices ED. The encapsulation layer 200 may be a single layer or a multi-layer. In addition to the encapsulation layer 200, the encapsulation portion may further include a dam DAM.

Hereinafter, it will be described in more detail a vertical structure of the display panel 110 according to embodiments of the present disclosure with reference to FIG. 3.

Referring to FIG. 3, a first buffer layer 311 may be disposed on a substrate 111. The first buffer layer 311 may be a single layer or a multilayer. If the first buffer layer 311 is a multilayer, the first buffer layer 311 may include a multi-buffer layer 311a and an active buffer layer 311b.

The first active layer ACT1 of the first transistor TFT1 may be disposed on the first buffer layer 311. The first active layer ACT1 may include a channel region where a channel is formed, a source connection region on one side of the channel region, and a drain connection region on the other side of the channel region.

A first gate insulating layer 312 may be disposed on the first active layer ACT1 of the first transistor TFT1. The first gate electrode E1a of the first transistor TFT1 may be disposed on the first gate insulating layer 312. A first interlayer insulating layer 313 may be disposed on the first gate electrode E1a of the first transistor TFT1.

A second buffer layer 321 may be disposed on the first interlayer insulating layer 313.

The second active layer ACT2 of the second transistor TFT2 may be disposed on the second buffer layer 321. The second active layer ACT2 may include a channel region in which a channel is formed, a source connection region on one side of the channel region, and a drain connection region on the other side of the channel region.

A second gate insulating layer 322 may be disposed on the second active layer ACT2 of the second transistor TFT2. The second gate electrode E2a of the second transistor TFT2 may be disposed. A second interlayer insulating layer 323 may be disposed on the second gate electrode E2a of the second transistor TFT2.

The first source electrode E1b and the first drain electrode E1c of the first transistor TFT1 and the second source electrode E2b and the second drain electrode E2c of the second transistor TFT2 may be disposed on the second interlayer insulating layer 323.

The first source electrode E1b and the first drain electrode E1c of the first transistor TFT1 may be connected to the source connection region and the drain connection region of the first active layer ACT1 through holes in the second interlayer insulating layer 323, the second gate insulating layer 322, the second buffer layer 321, the first interlayer insulating layer 313, and the first gate insulating layer 312, respectively.

The second source electrode E2b and the second drain electrode E2c of the second transistor TFT2 may be connected to the source connection region and the drain connection region of the second active layer ACT2 through holes in the second interlayer insulating layer 323 and the second gate insulating layer 322, respectively.

The first source electrode E1b and the first drain electrode E1c of the first transistor TFT1, and the second source electrode E2b and the second drain electrode E2c of the second transistor TFT2 may include a first metal, and may be disposed in a first metal layer. Here, the first metal and the first metal layer may be referred to as a first source-drain metal and a first source-drain metal layer.

Referring to FIG. 3, as an example, the storage capacitor Cst may be formed by the first capacitor electrode CAPE1 and the second capacitor electrode CAPE2. In some cases, the storage capacitor Cst may be formed by three or more capacitor electrodes, and may be in the form of two or more capacitors connected in parallel.

Each of the first capacitor electrode CAPE1 and the second capacitor electrode CAPE2 may be disposed on a plurality of metal layers disposed within the display panel 110.

For example, the first capacitor electrode CAPE1 may include the same first gate metal as the first gate electrode E1a of the first transistor TFT1 on the first gate insulating layer 312, and may be disposed within the first gate metal layer.

For example, the second capacitor electrode CAPE2 may be disposed on the first interlayer insulating layer 313.

The second source electrode E2b of the second transistor TFT2 may be electrically connected to the second capacitor electrode CAPE2 through a hole of the second interlayer insulating layer 323, the second gate insulating layer 322, and the second buffer layer 321.

For example, the first transistor TFT1 may be the scan transistor ST of FIG. 2, and the second transistor TFT2 may be the driving transistor DT of FIG. 2.

The transistor formation portion may further include a plurality of metal layers MP1 and MP2. For example, a first metal layer MP1 may be disposed between the multi-buffer layer 311a and the active buffer layer 311b included in the first buffer layer 311. A second metal layer MP2 may include the same first gate metal as the first gate electrode E1a of the first transistor TFT1, and may be disposed within the first gate metal layer. The first metal layer MP1 may be a first metal pattern, and the second metal layer MP2 may be a second metal pattern, but the embodiments of the present disclosure are not limited thereto.

Each of the first metal layer MP1 and the second metal layer MP2 may be disposed in the display area DA or the non-display area NDA.

Referring to FIG. 3, the transistor formation portion may further include a first shield metal BSM1 disposed on the substrate 111, overlapping the first active layer ACT1 of the first transistor TFT1, and disposed below the first active layer ACT1 of the first transistor TFT1. For example, the first shield metal BSM1 may be disposed between the substrate 111 and the first buffer layer 311, or may be disposed between the multi-buffer layer 311a and the active buffer layer 311b.

The transistor formation portion may further include a second shield metal BSM2 disposed on the substrate 111, overlapping the second active layer ACT2 of the second transistor TFT2, and disposed below the second active layer ACT2 of the second transistor TFT2.

For example, the second shield metal BSM2 may be disposed in a metal layer between the first interlayer insulating layer 313 and the second buffer layer 321. The second shield metal BSM2 may be disposed in the same metal layer as the second capacitor CAPE2.

For another example, the second shield metal BSM2 may be disposed in the same first gate metal layer as the first gate electrode E1a of the first transistor TFT1. Referring to FIG. 3, the transistor formation portion may further include a common driving voltage pattern CVP to which a common driving voltage is applied. For example, the common driving voltage applied to the common driving voltage pattern CVP may be also referred to as a power signal, and may be a first common driving voltage VDD or a second common driving voltage VSS. The first common driving voltage VDD may also be referred to as a high-potential power voltage (or high-potential power signal), and the second common driving voltage VSS may also be referred to as a low-potential power voltage (or low-potential power signal) or a base voltage.

The common driving voltage pattern CVP may be disposed in the display area DA or the non-display area NDA.

At least one planarization layer may be disposed on the first transistor TFT1 and the second transistor TFT2. In the example of FIG. 3, two planarization layers 331 and 332 are disposed on the first transistor TFT1 and the second transistor TFT2. In some cases, three or more planarization layers may be disposed on the first transistor TFT1 and the second transistor TFT2, but the embodiments of the present disclosure are not limited thereto.

Referring to FIG. 3, a first planarization layer 331 may be disposed on the first source electrode E1b and the first drain electrode E1c of the first transistor TFT1 and the second source electrode E2b and the second drain electrode E2c of the second transistor TFT2. For example, the first planarization layer 331 may be disposed so as to cover both the first transistor TFT1 and the second transistor TFT2.

Referring to FIG. 3, a relay electrode RE may be disposed on the first planarization layer 331. The relay electrode RE may electrically connect the second source electrode E2b of the second transistor TFT2 and the pixel electrode PE.

The relay electrode RE may be electrically connected to the second source electrode E2b of the second transistor TFT2 through a hole of the first planarization layer 331. Here, the second source electrode E2b of the second transistor TFT2 may be electrically connected to the second capacitor electrode CAPE2 of the storage capacitor Cst.

The relay electrode RE may be disposed within the second metal layer on the first planarization layer 331, and may include a second metal. The second metal and the second metal layer may be referred to as a second source-drain metal and a second source-drain metal layer.

A second planarization layer 332 may be disposed on the relay electrode RE.

Referring to FIG. 3, a light emitting device formation portion may be disposed on the second planarization layer 332. The light emitting device ED may be formed on the second planarization layer 332. The light emitting device ED may include a pixel electrode PE, an intermediate layer EL, and a common electrode CE. The emission area of the light emitting device ED may be formed in an area where the pixel electrode PE, the intermediate layer EL, and the common electrode CE overlap and contact each other.

The pixel electrode PE may be disposed on the second planarization layer 332. The pixel electrode PE may be electrically connected to the relay electrode RE through a hole of the second planarization layer 332.

A bank 333 may be disposed on the pixel electrode PE. An opening of the bank 333 may expose a portion of the pixel electrode PE to form an emission area. For example, the opening of the bank 333 may overlap with a portion of the pixel electrode PE.

The intermediate layer EL of the light emitting device ED may be disposed on a portion of the pixel electrode PE and the bank 333. The common electrode CE may be disposed on the intermediate layer EL.

Referring to FIG. 3, the encapsulation portion may be disposed on the light emitting device formation portion, and may be located on the common electrode CE. The encapsulation portion may include an encapsulation layer 200 formed on the common electrode CE.

The encapsulation layer 200 may prevent or at least reduce moisture or oxygen from penetrating into the light emitting device ED. For example, the encapsulation layer 200 may prevent or at least reduce moisture or oxygen from penetrating into an organic material included in the intermediate layer EL of the light emitting device ED. Here, the encapsulation layer 200 may be composed of a single layer or a multilayer, but the embodiments of the present disclosure are not limited thereto.

Referring to FIG. 3, as an example, the encapsulation layer 200 may include a first encapsulation layer 341, a second encapsulation layer 342, and a third encapsulation layer 343. For example, the first encapsulation layer 341 and the third encapsulation layer 343 may include an inorganic layer, and the second encapsulation layer 342 may include an organic layer.

The display panel 110 according to embodiments of the present disclosure may also include a touch sensor TS. In this case, the display panel 110 according to embodiments of the present disclosure may include a touch sensor layer 210 formed on an encapsulation layer 200.

Referring to FIG. 3, the touch sensor layer 210 may include a plurality of first electrode lines SEL1 extending in a first direction (e.g., column direction) and a plurality of second electrode lines SEL2 extending in a second direction (e.g., row direction).

Each of the plurality of first electrode lines SEL1 may include a plurality of first electrodes SE1 and a plurality of bridges BRG electrically connecting the plurality of first electrodes SE1.

Each of the plurality of second electrode lines SEL2 may be a single electrode formed integrally.

The touch sensor layer 210 may further include a bridge metal layer on which a plurality of bridges BRG are disposed and a sensor metal layer on which a plurality of first electrodes SE1 and a plurality of second electrode lines SEL2 are disposed.

The touch sensor layer 210 may further include insulating layers such as a sensor buffer layer 351 on the encapsulation layer 200, a sensor interlayer insulating layer 352 on the sensor buffer layer 351, and a sensor protection layer 353 on the sensor interlayer insulating layer 352. Here, the sensor buffer layer 351 may be omitted. For example, the sensor buffer layer 351 may be an inorganic layer or an organic layer, the sensor interlayer insulating layer 352 may be an inorganic layer or an organic layer, and the sensor protection layer 353 may be an organic layer or an inorganic layer.

The bridge metal layer may be a first metal layer between the sensor buffer layer 351 and the sensor interlayer insulating layer 352, and may be composed of a bridge metal. The sensor metal layer may be a second metal layer between the sensor interlayer insulating layer 352 and the sensor protection layer 353, and may be composed of a sensor metal.

Each of the plurality of first electrodes SE1 and the plurality of second electrode lines SEL2 included in the plurality of first electrode lines SEL1 may be a mesh-type electrode having a plurality of openings.

The plurality of bridges BRG included in the plurality of first electrode lines SEL1 may also be a mesh-type electrode having a plurality of openings.

Referring to FIG. 3, the plurality of first electrode lines SEL1 and the plurality of second electrode lines SEL2 may be disposed so as not to overlap with the light emitting device ED, and may overlap with the bank 333.

Referring to FIG. 3, as an example, the plurality of routing wires RW may have a single-layer structure disposed within the bridge metal layer or the sensor metal layer. As another example, the plurality of routing wires RW may have a double-layer structure disposed within both the bridge metal layer and the sensor metal layer. If the display panel 110 is a type incorporating a touch sensor TS, the routing wire RW may extend along an outer slope SLP_ENCAP or an inclined surface of the encapsulation layer 200, and may extend beyond the top of the dam DAM to a touch pad TP in the non-display area NDA.

According to the touch display device 100 according to the embodiments of the present disclosure, the touch sensor layer 210 may be disposed on the encapsulation layer 200 on the common electrode CE. Accordingly, an undesired parasitic capacitance may be formed between the touch sensor TS formed on the touch sensor layer 210 and the common electrode CE. This may cause a coupling noise between the touch sensor TS and the common electrode CE, which may cause distortion of touch sensing (e.g., finger touch sensing, pen touch sensing).

Hereinafter, it will be described the touch sensor TS according to the embodiments of the present disclosure in more detail. Hereinafter, for the convenience of explanation, it is assumed as an example that the first direction is the column direction and the second direction is the row direction. Accordingly, the plurality of first electrode lines SEL1 are described as a plurality of vertical electrode lines, the plurality of first electrodes SE1 included in each of the plurality of first electrode lines SEL1 are described as a plurality of vertical electrodes, and the plurality of second electrode lines SEL2 are described as a plurality of horizontal electrode lines.

Figure 4:
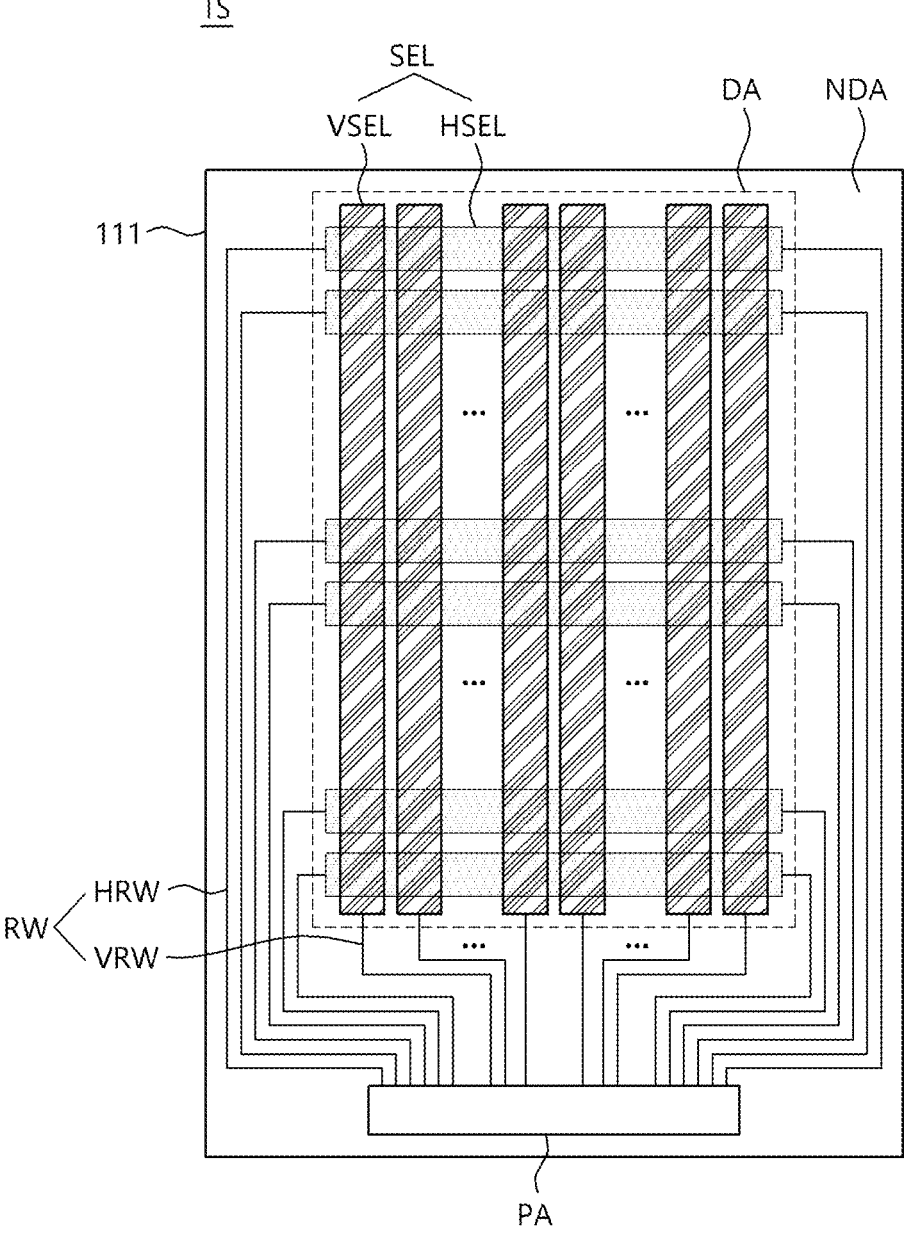
FIG. 4 illustrates a planar structure of a touch sensor according to embodiments of the present disclosure.

FIG. 4 illustrates a planar structure of a touch sensor TS according to embodiments of the present disclosure.

Referring to FIG. 4, the touch sensor TS according to the embodiments of the present disclosure may include a plurality of electrode lines SEL. The plurality of electrode lines SEL may include a plurality of vertical electrode lines VSEL extending in the column direction and a plurality of horizontal electrode lines HSEL extending in the row direction. The plurality of vertical electrode lines VSEL and the plurality of horizontal electrode lines HSEL may intersect each other.

Referring to FIG. 4, the touch sensor TS according to the embodiments of the present disclosure may include a plurality of routing wires RW connecting the plurality of electrode lines SEL and a pad area PA. The plurality of routing wires RW may include a plurality of vertical routing wires VRW connecting the plurality of vertical electrode lines VSEL and the pad area PA, and a plurality of horizontal routing wires HRW connecting the plurality of horizontal electrode lines HSEL and the pad area PA.

Referring to FIG. 4, a plurality of electrode lines SEL may be disposed in a display area DA of a substrate 111. A plurality of routing wires RW and the pad area PA may be disposed in a non-display area NDA.

In FIG. 4, each of the plurality of electrode lines SEL is illustrated as a bar shape, but this is only an equivalent illustration, and may have a shape different from the bar shape.

According to the touch display device 100 according to the embodiments of the present disclosure, a touch sensor TS may be disposed on an encapsulation layer 200 on a common electrode CE. Accordingly, an unwanted parasitic capacitance may be formed between the touch sensor TS and the common electrode CE, and as a result, coupling noise may be induced in the touch sensor TS with the common electrode CE. This coupling noise may cause distortion of touch sensing (e.g., finger touch sensing, pen touch sensing).

Accordingly, embodiments of the present disclosure disclose a touch sensor TS having a structure capable of improving the performance of touch sensing (e.g., finger touch sensing, pen touch sensing) by reducing coupling noise with other surrounding electrodes (e.g., common electrode CE etc.) and a touch display device 100 including the same.

In embodiments of the present disclosure, a touch sensor TS having a structure capable of reducing coupling noise with other surrounding electrodes (e.g., common electrode CE etc.) may be referred to as a "coil-type touch sensor TS."

According to the coil-type touch sensor TS according to the embodiments of the present disclosure, each of the plurality of electrode lines SEL may have a coil shape. Hereinafter, it will be described a coil-type touch sensor TS according to the embodiments of the present disclosure in more detail.

Figure 5:
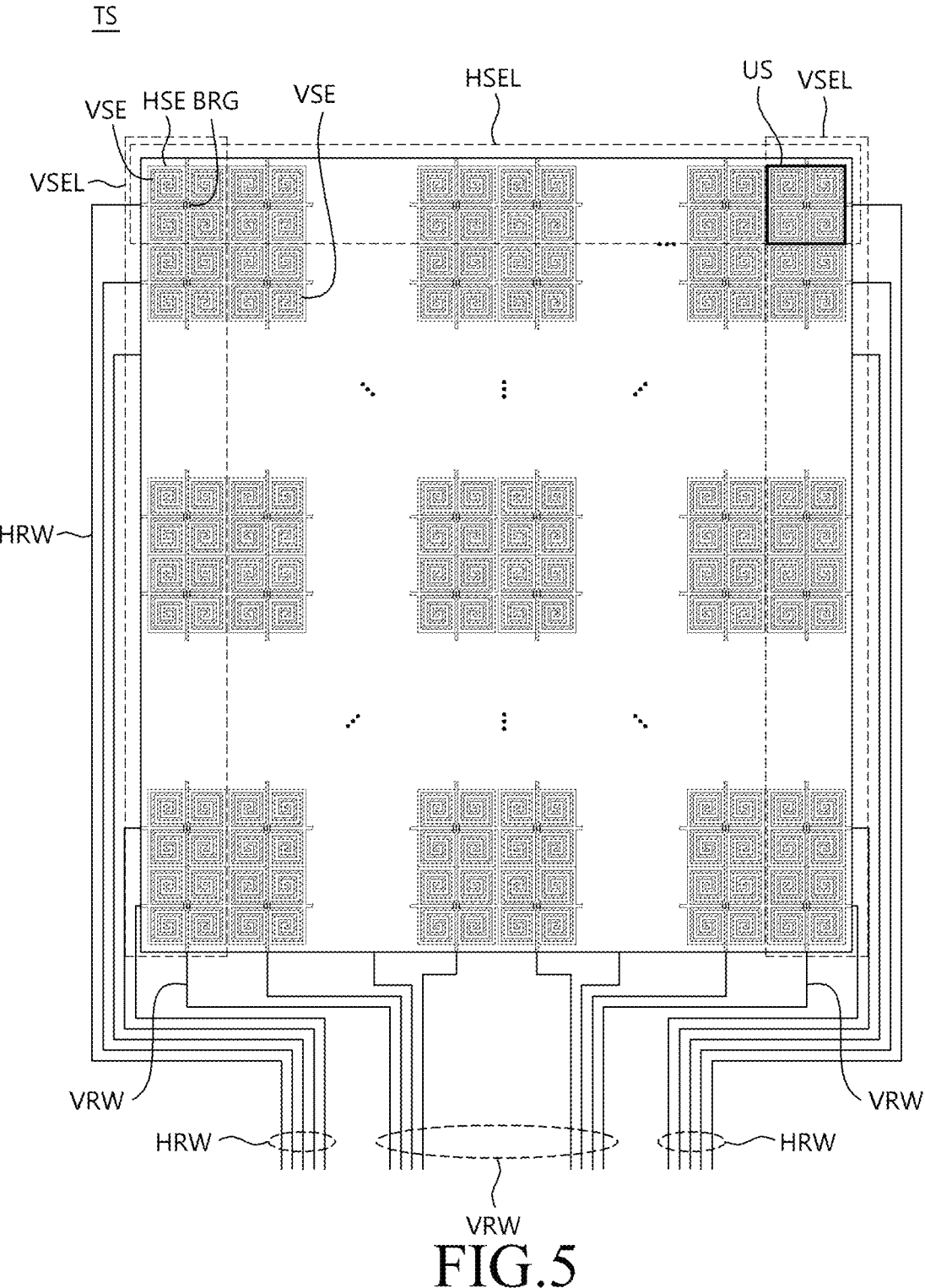
FIG. 5 illustrates a planar structure of a coil-type touch sensor according to embodiments of the present disclosure.

FIG. 5 illustrates a planar structure of a coil-type touch sensor TS according to embodiments of the present disclosure.

Referring to FIG. 5, the coil-type touch sensor TS according to the embodiments of the present disclosure may include a plurality of vertical electrode lines VSEL which are a plurality of first electrode lines SEL1 extending in a first direction (e.g., column direction) and having a coil shape, and a plurality of horizontal electrode lines HSEL which are a plurality of second electrode lines SEL2 extending in a second direction (e.g., row direction) different from the first direction (e.g., column direction) and having a coil shape.

Referring to FIG. 5, according to the coil-type touch sensor TS according to the embodiments of the present disclosure, the plurality of vertical electrode lines VSEL and the plurality of horizontal electrode lines HSEL may be interlocked with each other on the same plane and wound into a coil shape.

Referring to FIG. 5, the coil-type touch sensor TS according to the embodiments of the present disclosure may further include a plurality of vertical routing wires VRW connected to a plurality of vertical electrode lines VSEL and a plurality of horizontal routing wires HRW connected to a plurality of horizontal electrode lines HSEL.

Referring to FIG. 5, each of the plurality of vertical electrode lines VSEL may include a plurality of vertical electrodes VSE and a bridge BRG electrically connecting two adjacent vertical electrodes VSE among the plurality of vertical electrodes VSE.

The vertical electrode lines VSEL and the horizontal electrode lines HSEL may intersect each other. Accordingly, the bridge BRG included in the vertical electrode lines VSEL may overlap with one of the plurality of horizontal electrode lines HSEL.

A plurality of bridges BRG included in each of the plurality of vertical electrode lines VSEL may be disposed in a first metal layer (e.g., bridge metal layer). A plurality of vertical electrodes VSE included in each of the plurality of vertical electrode lines VSEL may be disposed in a second metal layer (e.g., sensor metal layer), and a horizontal electrode line HSEL may be disposed in a second metal layer (e.g., sensor metal layer). An insulating layer may exist between the first metal layer and the second metal layer.

Referring to FIG. 5, the coil-type touch sensor TS according to embodiments of the present disclosure may include a plurality of unit sensor areas US where a plurality of vertical electrode lines VSEL and a plurality of horizontal electrode lines HSEL intersect. That is, one unit sensor area US may be an area where one vertical electrode line VSEL and one horizontal electrode line HSEL intersect.

Meanwhile, the plurality of horizontal electrode lines HSEL and the plurality of vertical electrode lines VSEL may be disposed within the touch sensor layer 210 on the encapsulation layer 200. That is, the plurality of horizontal electrode lines HSEL and the plurality of vertical electrode lines VSEL may be disposed on the encapsulation layer 200.

The touch sensor TS may be embedded in the display panel 110. As a result, a plurality of horizontal routing wires HRW and a plurality of vertical routing wires VRW may be disposed along an inclined surface or a slope SLP of the encapsulation layer 200.

Hereinafter, it will be described a structure of the coil-type touch sensor TS according to embodiments of the present disclosure in more detail.

Figure 6:
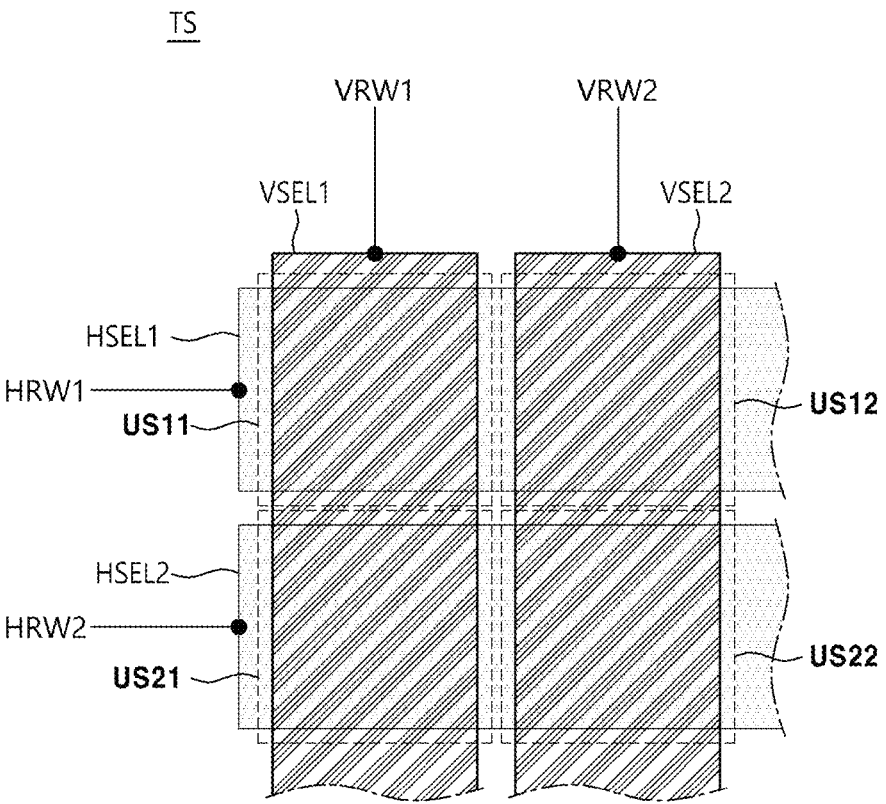
FIG. 6 illustrates a portion of a coil-type touch sensor according to embodiments of the present disclosure.

FIG. 6 illustrates a portion of a coil-type touch sensor TS according to embodiments of the present disclosure.

In describing a structure of the coil-type touch sensor TS according to the embodiments of the present disclosure, it will be first described a schematic structure of a portion of the touch sensor TS representing a structure of the touch sensor TS with reference to FIG. 6.

Referring to FIG. 6, according to the coil-type touch sensor TS according to the embodiments of the present disclosure, a plurality of unit sensor areas US may include first to fourth unit sensor areas US11, US12, US21, and US22 arranged in two rows and two columns.

The first unit sensor area US11 may be an area where a first horizontal electrode line HSEL1 among a plurality of horizontal electrode lines HSEL and a first vertical electrode line VSEL1 among a plurality of vertical electrode lines VSEL intersect.

In the first unit sensor area US11, a first horizontal electrode line HSEL1 and a first vertical electrode line VSEL1 may be disposed. The first horizontal electrode line HSEL1 may be connected to the first horizontal routing wire HRW1, and the first vertical electrode line VSEL1 may be connected to the first vertical routing wire VRW1.

The second unit sensor area US12 may be an area where a first horizontal electrode line HSEL1 among a plurality of horizontal electrode lines HSEL and a second vertical electrode line VSEL2 among a plurality of vertical electrode lines VSEL intersect.

In the second unit sensor area US12, a first horizontal electrode line HSEL1 and a second vertical electrode line VSEL2 may be disposed. The first horizontal electrode line HSEL1 may be connected to the first horizontal routing wire HRW1, and the second vertical electrode line VSEL2 may be connected to the second vertical routing wire VRW2.

The third unit sensor area US21 may be an area where a second horizontal electrode line HSEL2 among the plurality of horizontal electrode lines HSEL and a first vertical electrode line VSEL1 among the plurality of vertical electrode lines VSEL intersect.

In the third unit sensor area US21, a second horizontal electrode line HSEL2 and a first vertical electrode line VSEL1 may be disposed. The second horizontal electrode line HSEL2 may be connected to the second horizontal routing wire HRW2, and the first vertical electrode line VSEL1 may be connected to the first vertical routing wire VRW1.

The fourth unit sensor area US22 may be an area where a second horizontal electrode line HSEL2 among the plurality of horizontal electrode lines HSEL and a second vertical electrode line VSEL2 among the plurality of vertical electrode lines VSEL intersect.

In the fourth unit sensor area US22, the second horizontal electrode line HSEL2 and the second vertical electrode line VSEL2 may be disposed. The second horizontal electrode line HSEL2 may be connected to the second horizontal routing wire HRW2, and the second vertical electrode line VSEL2 may be connected to the second vertical routing wire VRW2.

The first horizontal electrode line HSEL1, the second horizontal electrode line HSEL2, the first vertical electrode line VSEL1, and the second vertical electrode line VSEL2 may have unique coil shapes in each of the four unit sensor areas US11, US12, US21 and US22.

The first horizontal electrode line HSEL1 may pass through the first unit sensor area US11 and the second unit sensor area US12. A coil shape of the first horizontal electrode line HSEL1 in the first unit sensor area US11 and a coil shape of the first horizontal electrode line HSEL1 in the second unit sensor area US12 may be identical and repetitive.

The second horizontal electrode line HSEL2 may pass through the third unit sensor area US21 and the fourth unit sensor area US22. A coil shape of the second horizontal electrode line HSEL2 within the third unit sensor area US21 and a coil shape of the second horizontal electrode line HSEL2 within the fourth unit sensor area US22 may be the same and may be repeated.

The first vertical electrode line VSEL1 may pass through the first unit sensor area US11 and the third unit sensor area US21. A coil shape of the first vertical electrode line VSEL1 within the first unit sensor area US11 and a coil shape of the first vertical electrode line VSEL1 within the third unit sensor area US21 may be the same and may be repeated.

The second vertical electrode line VSEL2 may pass through the second unit sensor area US12 and the fourth unit sensor area US22. A coil shape of the second vertical electrode line VSEL2 within the second unit sensor area US12 and a coil shape of the second vertical electrode line VSEL2 within the fourth unit sensor area US22 may be the same and may be repeated.

Hereinafter, it will be described a structure of the coil-type touch sensor TS according to embodiments of the present disclosure through the first unit sensor area US11.

Figure 7:
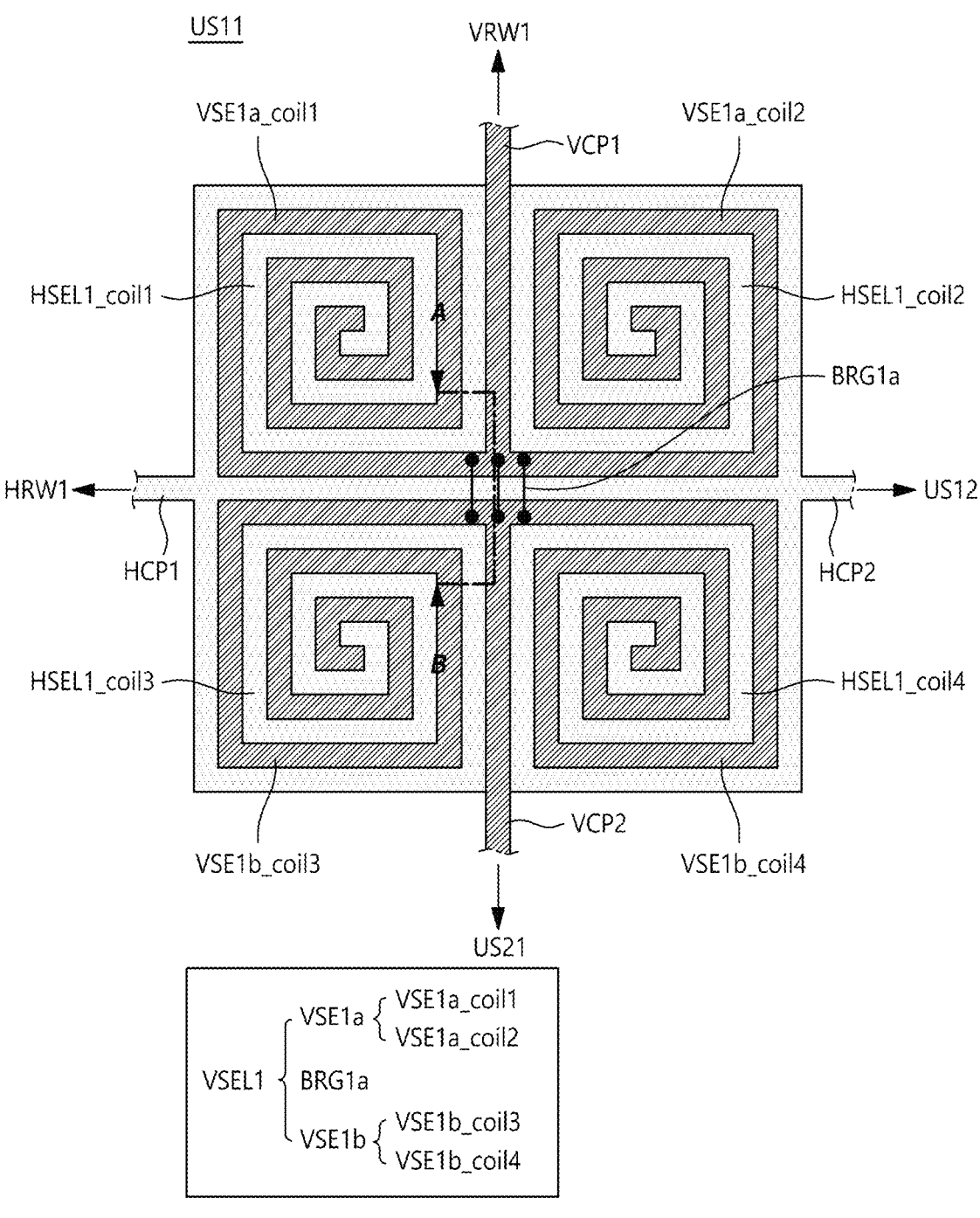
FIG. 7 illustrates a unit sensor area in a coil-type touch sensor according to embodiments of the present disclosure.

FIG. 7 illustrates a first unit sensor area US11 in a coil-type touch sensor TS according to embodiments of the present disclosure.

Referring to FIG. 7, the first horizontal electrode line HSEL1 and the first vertical electrode line VSEL1 may pass through the first unit sensor area US11. Within the first unit sensor area US11, the first vertical electrode line VSEL1 may include a first vertical electrode VSE1*a*, a second vertical electrode VSE1*b*, and at least one first bridge BRG1*a* connecting the first vertical electrode VSE1*a* and the second vertical electrode VSE1*b*.

Within the first unit sensor area US11, each of the first horizontal electrode line HSEL1 and the first vertical electrode line VSEL1 may have a coil shape. For example, within the first unit sensor area US11, each of the first horizontal electrode line HSEL1 and the first vertical electrode line VSEL1 may have a coil shape on the same plane.

Within the first unit sensor area US11, the first vertical electrode line VSEL1 and the first horizontal electrode line HSEL1 may not be wound separately, but may be wound in a coil shape while interlocking with each other.

Referring to FIG. 7, within the first unit sensor area US11, the first vertical electrode line VSEL1 may be wound in a coil shape between a first vertical point VCP1 and a second vertical point VCP2 within the first unit sensor area US11.

In addition, within the first unit sensor area US11, the first horizontal electrode line HSEL1 may be wound in a coil shape between a first horizontal point HCP1 and a second horizontal point HCP2 within the first unit sensor area US11.

For example, the first vertical point VCP1 may correspond to a point where the first vertical electrode line VSEL1 and the first vertical routing wire VRW1 are connected, or may be a point connected to a unit sensor area adjacent to the first unit sensor area US11 in the column direction, or may be an edge of the first vertical electrode line VSEL1.

The second vertical point VCP2 may be a point connected to a third unit sensor area US21 adjacent to the first unit sensor area US11 in the column direction.

The first horizontal point HCP1 may correspond to a point where the first horizontal electrode line HSEL1 and the first horizontal routing wire HRW1 are connected, or may be a point connected to a unit sensor area US12 adjacent to the first unit sensor area US11 in the row direction, or may be an edge of the first horizontal electrode line HSEL1.

The second horizontal point HCP2 may be a point connected to another second unit sensor area US12 adjacent to the first unit sensor area US11 in the row direction.

Referring to FIG. 7, within the first unit sensor area US11, the first vertical electrode line VSEL1 may include a first vertical electrode VSE1*a* extending from the first vertical point VCP1 and having a coil shape, a second vertical electrode VSE1*b* extending from the second vertical point VCP2 and having a coil shape, and a first bridge BRG1*a* connecting the first vertical electrode VSE1*a* and the second vertical electrode VSE1*b*.

More specifically, it will be described as follows.

The first vertical electrode VSE1*a* may include a first vertical coil portion VSE1*a*_coil1 and a second vertical coil portion VSE1*a*_coil2. The first vertical coil portion VSE1*a*_coil1 and the second vertical coil portion VSE1*a*_coil2 may be integrally formed, and may be portions extending and branching from the first vertical point VCP1.

The second vertical electrode VSE1*b* may include a third vertical coil portion VSE1*b*_coil3 and a fourth vertical coil portion VSE1*b*_coil4. The third vertical coil portion VSE1*b*_coil3 and the fourth vertical coil portion VSE1*b*_coil4 may be integrally formed, and may be portions extending and branching from the second vertical point VCP2.

Referring to FIG. 7, within the first unit sensor area US11, the first horizontal electrode line HSEL1 may be wound together with the first vertical electrode VSE1*a* on the same plane as the first vertical electrode VSE1*a*.

Within the first unit sensor area US11, the first horizontal electrode line HSEL1 may be wound together with the second vertical electrode VSE1*b* on the same plane as the second vertical electrode VSE1*b*.

More specifically, it will be described as follows.

The first horizontal electrode line HSEL1 may include a first horizontal coil portion HSEL1_coil1 wound with the first vertical coil portion VSE1*a*_coil1, a second horizontal coil portion HSEL1_coil2 wound with the second vertical coil portion VSE1*a*_coil2, a third horizontal coil portion HSEL1_coil3 wound with the third vertical coil portion VSE1*b*_coil3, and a fourth horizontal coil portion HSEL1_coil4 wound with the fourth vertical coil portion VSE1*b*_coil4.

The first horizontal coil portion HSEL1_coil1, the second horizontal coil portion HSEL1_coil2, the third horizontal coil portion HSEL1_coil3, and the fourth horizontal coil portion HSEL1_coil4 may be formed as one piece.

The first horizontal coil portion HSEL1_coil1 and the third horizontal coil portion HSEL1_coil3 may be portions extending and branching from the first horizontal point HCP1. The second horizontal coil portion HSEL1_coil2 and the fourth horizontal coil portion HSEL1_coil4 may be portions extending and branching from the second horizontal point HCP2.

Referring to FIG. 7, in the first unit sensor area US11, the first horizontal electrode line HSEL1 may have a symmetrical coil shape, and the first vertical electrode line VSEL1 may have a symmetrical coil shape.

Referring to FIG. 7, a coil shape of the first vertical coil portion VSE1*a*_coil1 and a coil shape of the second vertical coil portion VSE1*a*_coil2 may be symmetrical to each other. A coil shape of the third vertical coil portion VSE1*b*_coil3 and a coil shape of the fourth vertical coil portion VSE1*b*_coil4 may be symmetrical to each other. A coil shape of the first vertical coil portion VSE1*a*_coil1 and a coil shape of the third vertical coil portion VSE1*b*_coil3 may be symmetrical to each other. A coil shape of the second vertical coil portion VSE1*a*_coil2 and a coil shape of the fourth vertical coil portion VSE1*b*_coil4 may be symmetrical to each other.

Referring to FIG. 7, a coil shape of the first horizontal coil portion HSEL1_coil1 and a coil shape of the second horizontal coil portion HSEL1_coil2 may be symmetrical to each other. A coil shape of the third horizontal coil portion HSEL1_coil3 and a coil shape of the fourth horizontal coil portion HSEL1_coil4 may be symmetrical to each other. A coil shape of the first horizontal coil portion HSEL1_coil1 and a coil shape of the third horizontal coil portion HSEL1_coil3 may be symmetrical to each other. A coil shape of the second horizontal coil portion HSEL1_coil2 and a coil shape of the fourth horizontal coil portion HSEL1_coil4 may be symmetrical to each other.

Figure 8:
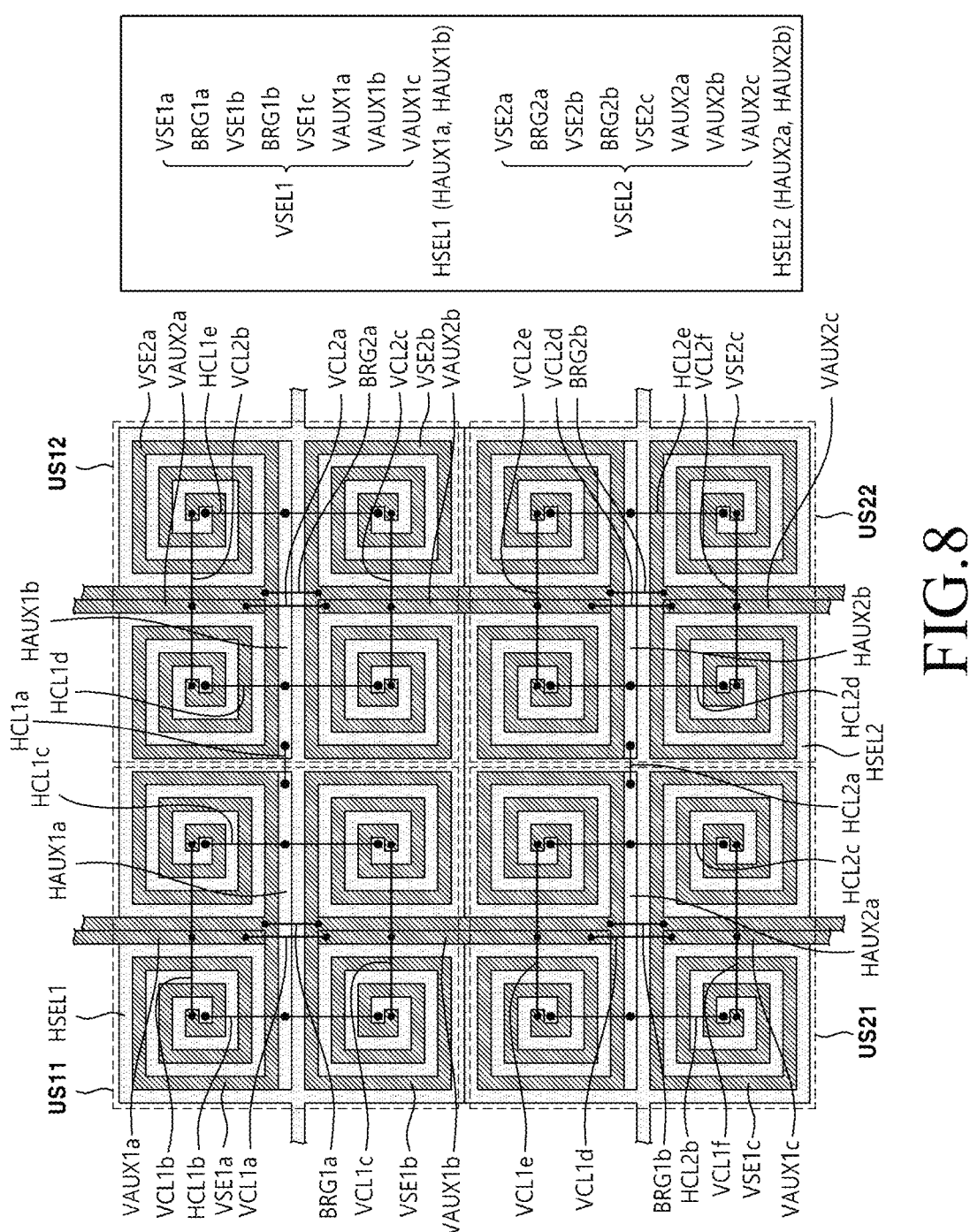
FIG. 8 illustrates four unit sensor areas in a coil-type touch sensor according to embodiments of the present disclosure.

FIG. 8 illustrates four unit sensor areas US11, US12, US21 and US22 in a coil-type touch sensor TS according to embodiments of the present disclosure. FIG. 6 is also referred to in the following description.

Referring to FIG. 8, the first unit sensor area US11 may be an area where the first horizontal electrode line HSEL1 and the first vertical electrode line VSEL1 intersect. The second unit sensor area US12 may be an area where the first horizontal electrode line HSEL1 and the second vertical electrode line VSEL2 intersect. The third unit sensor area US21 may be an area where the second horizontal electrode line HSEL2 and the first vertical electrode line VSEL1 intersect. The fourth unit sensor area US22 may be an area where the second horizontal electrode line HSEL2 and the second vertical electrode line VSEL2 intersect.

Within the first unit sensor area US11, each of the first horizontal electrode line HSEL1 and the first vertical electrode line VSEL1 may have a structure almost identical to the structure illustrated in FIG. 7. Within the second unit sensor area US12, each of the first horizontal electrode line HSEL1 and the second vertical electrode line VSEL2 may have a structure almost identical to the structure illustrated in FIG. 7. Within the third unit sensor area US21, each of the second horizontal electrode line HSEL2 and the first vertical electrode line VSEL1 may have a structure almost identical to the structure illustrated in FIG. 7. Within the fourth unit sensor area US22, each of the second horizontal electrode line HSEL2 and the second vertical electrode line VSEL2 may have a structure almost identical to the structure illustrated in FIG. 7. Therefore, hereinafter, it will be mainly described a configuration different from a structure illustrated in FIG. 7.

The first vertical electrode line VSEL1 may include a first vertical electrode VSE1a, a second vertical electrode VSE1b, and a third vertical electrode VSE1c. The first vertical electrode VSE1a, the second vertical electrode VSE1b, and the third vertical electrode VSE1c may be arranged adjacently in the column direction.

The first vertical electrode line VSEL1 may further include a first bridge BRG1a connecting the first vertical electrode VSE1a and the second vertical electrode VSE1b, and a second bridge BRG1b connecting the second vertical electrode VSE1b and the third vertical electrode VSE1c.

The first vertical electrode line VSEL1 may further include a first vertical auxiliary electrode VAUX1a, a second vertical auxiliary electrode VAUX1b, and a third vertical auxiliary electrode VAUX1c.

The first vertical auxiliary electrode VAUX1a may be arranged across the first unit sensor area US11 and another unit sensor area thereon. Within the first unit sensor area US11, the first vertical auxiliary electrode VAUX1a may be disposed between the first vertical electrode VSE1a and the first horizontal electrode line HSEL1, and may be electrically connected to the first vertical electrode VSE1a.

The second vertical auxiliary electrode VAUX1b may be disposed across the first unit sensor area US11 and the third unit sensor area US21 below the first unit sensor area US11. Within the first unit sensor area US11, the second vertical auxiliary electrode VAUX1b may be disposed between the second vertical electrode VSE1b and the first horizontal electrode line HSEL1, and may be electrically connected to the second vertical electrode VSE1b. Within the third unit sensor area US21, the second vertical auxiliary electrode VAUX1b may be disposed between the second vertical electrode VSE1b and the second horizontal electrode line HSEL2, and may be electrically connected to the second vertical electrode VSE1b.

The third vertical auxiliary electrode VAUX1c may be arranged across the third unit sensor area US21 and another unit sensor area below the third unit sensor area US21. Within the third unit sensor area US21, the third vertical auxiliary electrode VAUX1c may be disposed between the third vertical electrode VSE1c and the second horizontal electrode line HSEL2, and may be electrically connected to the third vertical electrode VSE1c.

Within the first unit sensor area US11, the first vertical auxiliary electrode VAUX1a and the second vertical auxiliary electrode VAUX1b may be electrically connected via a first vertical auxiliary bridge VCL1a, the first vertical auxiliary electrode VAUX1a and the first vertical electrode VSE1a may be electrically connected via a second vertical auxiliary bridge VCL1b, and the second vertical auxiliary electrode VAUX1b and the second vertical electrode VSE1b may be electrically connected via a third vertical auxiliary bridge VCL1c.

Within the third unit sensor area US21, the second vertical auxiliary electrode VAUX1b and the third vertical auxiliary electrode VAUX1c may be electrically connected via a fourth vertical auxiliary bridge VCL1d, the second vertical auxiliary electrode VAUX1b and the second vertical electrode VSE1b may be electrically connected via a fifth vertical auxiliary bridge VCL1e, and the third vertical auxiliary electrode VAUX1c and the third vertical electrode VSE1c may be electrically connected via a sixth vertical auxiliary bridge VCL1f.

The second vertical electrode line VSEL2 may include a fourth vertical electrode VSE2a, a fifth vertical electrode VSE2b, and a sixth vertical electrode VSE2c. The fourth vertical electrode VSE2a, the fifth vertical electrode VSE2b, and the sixth vertical electrode VSE2c may be arranged adjacently in the column direction.

The second vertical electrode line VSEL2 may further include a third bridge BRG2a connecting the fourth vertical electrode VSE2a and the fifth vertical electrode VSE2b, and a fourth bridge BRG2b connecting the fifth vertical electrode VSE2b and the sixth vertical electrode VSE2c.

The second vertical electrode line VSEL2 may further include a fourth vertical auxiliary electrode VAUX2a, a fifth vertical auxiliary electrode VAUX2b, and a sixth vertical auxiliary electrode VAUX2c.

The fourth vertical auxiliary electrode VAUX2a may be arranged across the second unit sensor area US12 and another unit sensor area above the second unit sensor area US12. Within the second unit sensor area US12, the fourth vertical auxiliary electrode VAUX2a may be disposed between the fourth vertical electrode VSE2a and the first horizontal electrode line HSEL1, and may be electrically connected to the fourth vertical electrode VSE2a.

The fifth vertical auxiliary electrode VAUX2b may be arranged across the second unit sensor area US12 and the fourth unit sensor area US22. Within the second unit sensor area US12, the fifth vertical auxiliary electrode VAUX2b may be disposed between the fifth vertical electrode VSE2b and the first horizontal electrode line HSEL1, and may be electrically connected to the fifth vertical electrode VSE2b. Within the fourth unit sensor area US22, the fifth vertical auxiliary electrode VAUX2b may be disposed between the fifth vertical electrode VSE2b and the second horizontal electrode line HSEL2, and may be electrically connected to the fifth vertical electrode VSE2b.

The sixth vertical auxiliary electrode VAUX2c may be arranged across the fourth unit sensor area US22 and another unit sensor area below the fourth unit sensor area US22. Within the fourth unit sensor area US22, the sixth vertical auxiliary electrode VAUX2c may be disposed between the sixth vertical electrode VSE2c and the second horizontal electrode line HSEL2, and may be electrically connected to the sixth vertical electrode VSE2c.

Within the second unit sensor area US12, the fourth vertical auxiliary electrode VAUX2a and the fifth vertical auxiliary electrode VAUX2b may be electrically connected via a seventh vertical auxiliary bridge VCL2a, the fourth vertical auxiliary electrode VAUX2a and the fourth vertical electrode VSE2a may be electrically connected via an eighth vertical auxiliary bridge VCL2b, and the fifth vertical auxiliary electrode VAUX2*b* and the fifth vertical electrode VSE2*b* may be electrically connected via a ninth vertical auxiliary bridge VCL2*c*.

Within the fourth unit sensor area US22, the fifth vertical auxiliary electrode VAUX2*b* and the sixth vertical auxiliary electrode VAUX2*c* may be electrically connected via a tenth vertical auxiliary bridge VCL2*d*, the fifth vertical auxiliary electrode VAUX2*b* and the fifth vertical electrode VSE2*b* may be electrically connected via an eleventh vertical auxiliary bridge VCL2*e*, and the sixth vertical auxiliary electrode VAUX2*c* and the sixth vertical electrode VSE2*c* may be electrically connected via a twelfth vertical auxiliary bridge VCL2*f*.

Referring to FIG. 8, the first horizontal electrode line HSEL1 may pass through the first unit sensor area US11 and the second unit sensor area US12 adjacent in the row direction.

The first horizontal electrode line HSEL1 may include a first horizontal auxiliary electrode HAUX1*a* and a second horizontal auxiliary electrode HAUX1*b*.

In the first unit sensor area US11, the first horizontal auxiliary electrode HAUX1*a* may be disposed between the first horizontal electrode line HSEL1 and the first vertical electrode VSE1*a*, and may be electrically connected to the first horizontal electrode line HSEL1.

In the second unit sensor area US12, the second horizontal auxiliary electrode HAUX1*b* may be disposed between the first horizontal electrode line HSEL1 and the fourth vertical electrode VSE2*a*, and may be electrically connected to the first horizontal electrode line HSEL1.

The first horizontal auxiliary electrode HAUX1*a* and the second horizontal auxiliary electrode HAUX1*b* may be electrically connected via a first horizontal auxiliary bridge HCL1*a*.

The first horizontal auxiliary electrode HAUX1*a* and the first horizontal electrode line HSEL1 may be electrically connected via at least one second horizontal auxiliary bridge HCL1*b* and HCL1*c*.

The second horizontal auxiliary electrode HAUX1*b* and the first horizontal electrode line HSEL1 may be electrically connected via at least one third horizontal auxiliary bridge HCL1*d* and HCL1*e*.

Referring to FIG. 8, the second horizontal electrode line HSEL2 may pass through the third unit sensor area US21 and the fourth unit sensor area US22 adjacent in the row direction.

The second horizontal electrode line HSEL2 may include a third horizontal auxiliary electrode HAUX2*a* and a fourth horizontal auxiliary electrode HAUX2*b*.

In the third unit sensor area US21, the third horizontal auxiliary electrode HAUX2*a* may be disposed between the second horizontal electrode line HSEL2 and the second vertical electrode VSE1*b*, and may be electrically connected to the second horizontal electrode line HSEL2.

In the fourth unit sensor area US22, the fourth horizontal auxiliary electrode HAUX2*b* may be disposed between the second horizontal electrode line HSEL2 and the fifth vertical electrode VSE2*b*, and may be electrically connected to the second horizontal electrode line HSEL2.

The third horizontal auxiliary electrode HAUX2*a* and the fourth horizontal auxiliary electrode HAUX2*b* may be electrically connected via a fourth horizontal auxiliary bridge HCL2*a*.

The third horizontal auxiliary electrode HAUX2*a* and the second horizontal electrode line HSEL2 may be electrically connected via at least one fifth horizontal auxiliary bridge HCL2*b* and HCL2*c*.

The fourth horizontal auxiliary electrode HAUX2*b* and the second horizontal electrode line HSEL2 may be electrically connected via at least one sixth horizontal auxiliary bridge HCL2*d* and HCL2*e*.

The coil-type touch sensor TS illustrated in FIG. 8 may further include first to sixth vertical auxiliary electrodes VAUX1*a*, VAUX1*b*, VAUX1*c*, VAUX2*a*, VAUX2*b* and VAUX2*c*, and first to fourth horizontal auxiliary electrodes HAUX1*a*, HAUX1*b*, HAUX2*a* and HAUX2*b*, compared to the coil-type touch sensor TS illustrated in FIG. 7. Accordingly, there may be improved an electrical connectivity of each of the first vertical electrode line VSEL1, the second vertical electrode line VSEL2, the first horizontal electrode line HSEL1, and the second horizontal electrode line HSEL2.

In the above, there has been described a planar structure of the coil-type touch sensor TS according to the embodiments of the present disclosure. Hereinafter, it will be described a vertical structure of the coil-type touch sensor TS according to the embodiments of the present disclosure.

Figure 9:
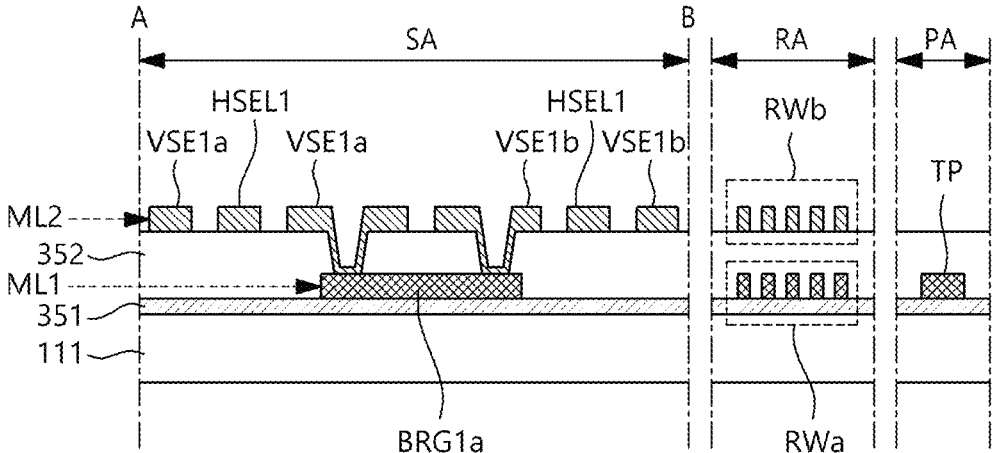
FIG. 9 is a cross-sectional view of a coil-type touch sensor according to embodiments of the present disclosure.

FIG. 9 is a cross-sectional view of a coil-type touch sensor TS according to embodiments of the present disclosure.

Referring to FIG. 9, the vertical structure of the coil-type touch sensor TS according to the embodiments of the present disclosure may include a vertical structure for a sensor area SA, a routing area RA, and a pad area PA. The vertical structure of the sensor area SA may correspond to a cross-sectional structure cut along the line A-B of FIG. 7.

Referring to FIG. 9, in order to form the coil-type touch sensor TS according to the embodiments of the present disclosure, the display panel 110 may include a sensor buffer layer 351 on the substrate 111, a first metal layer ML1 on the sensor buffer layer 351, a sensor interlayer insulating layer 352 on the first metal layer ML1, and a second metal layer ML2 on the sensor interlayer insulating layer 352. The first metal layer ML1 may be referred to as a bridge metal layer, and the second metal layer ML2 may be referred to as a sensor metal layer.

In the sensor area SA, a first bridge BRG1*a* may be disposed within the first metal layer ML1. Each of the plurality of vertical electrodes VSE1*a*, VSE1*b* may be disposed within the second metal layer ML2. Each of the plurality of horizontal electrode lines HSEL1 may be disposed within the second metal layer ML2.

In the sensor area SA, two adjacent vertical electrodes VSE1*a* and VSE1*b* may be electrically connected to the first bridge BRG1*a* through a hole in the sensor interlayer insulating layer 352.

In the routing area RA, a routing wire RW may include at least one of the first metal routing wires RWa disposed within the first metal layer ML1 and the second metal routing wire RWb disposed within the second metal layer ML2.

The first metal routing wire RWa and the second metal routing wire RWb may be electrically connected through a hole in the sensor interlayer insulating layer 352.

In the pad area PA, a touch pad TP is disposed on the substrate 111, and for example, may be disposed on the sensor buffer layer 351.

According to the coil-type touch sensor TS according to the embodiments of the present disclosure, the vertical auxiliary bridges and the horizontal auxiliary bridges may also be disposed within the first metal layer ML1. The vertical auxiliary electrodes and the horizontal auxiliary electrodes may also be disposed within the second metal layer ML2.

Figure 10:
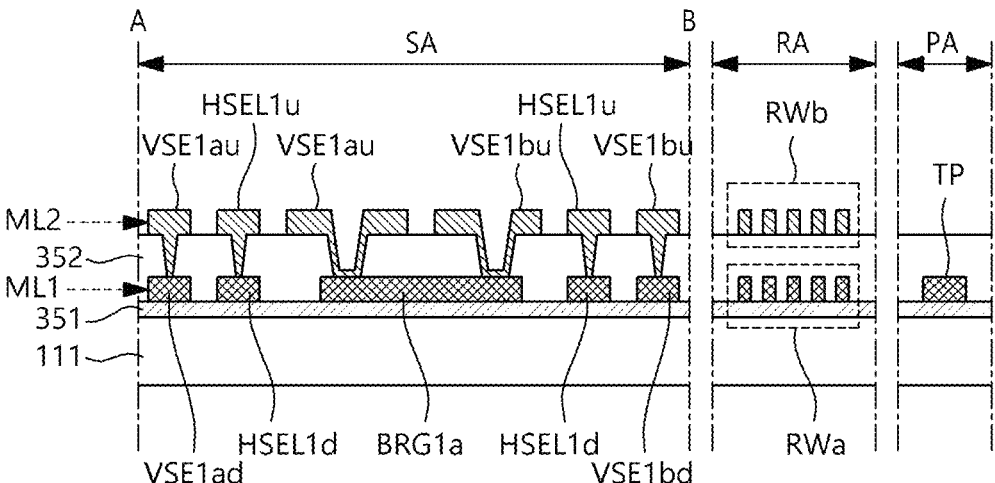
FIG. 10 is another cross-sectional view of a coil-type touch sensor according to embodiments of the present disclosure.

FIG. 10 is another cross-sectional view of a coil-type touch sensor TS according to embodiments of the present disclosure.

The vertical structure in the cross-sectional view of FIG. 10 may be basically the same as a vertical structure in the cross-sectional view of FIG. 9. However, in the sensor area SA, only the vertical structures of the vertical electrodes VSE1*a* and VSE1*b* and the horizontal electrode line HSEL1 are different. Hereinafter, it will be mainly explained the differences.

In FIG. 9, the vertical electrodes VSE1*a* and VSE1*b* and the horizontal electrode line HSEL1 of the sensor area SA may have single-layer electrode structures. However, in FIG. 10, the vertical electrodes VSE1*a* and VSE1*b* and the horizontal electrode line HSEL1 of the sensor area SA may be double-layer electrode structures.

Referring to FIG. 10, each of the plurality of vertical electrodes VSE1*a* and VSE1*b* may include a first metal vertical electrode VSE1*ad* and VSE1*bd* disposed in a first metal layer ML1 and a second metal vertical electrode VSE1*au* and VSE1*bu* disposed in a second metal layer ML2.

The second metal vertical electrodes VSE1*au* and VSE1*bu* may be electrically connected to the first metal vertical electrodes VSE1*ad* and VSE1*bd* through a hole in the sensor interlayer insulating layer 352.

Referring to FIG. 10, each of the plurality of horizontal electrode lines HSEL may include a first metal horizontal electrode line HSEL1*d* disposed in a first metal layer ML1 and a second metal horizontal electrode line HSEL1*u* disposed in a second metal layer ML2.

The second metal horizontal electrode line HSEL1*u* may be electrically connected to the first metal horizontal electrode line HSEL1*d* through another hole in the sensor interlayer insulating layer 352.

The second metal vertical electrodes VSE1*au* and VSE1*bu* included in each of the two vertical electrodes VSE1*a* and VSE1*b* may be electrically connected to the first bridge BRG1*a* through another hole in the sensor interlayer insulating layer 352.

Figure 11:
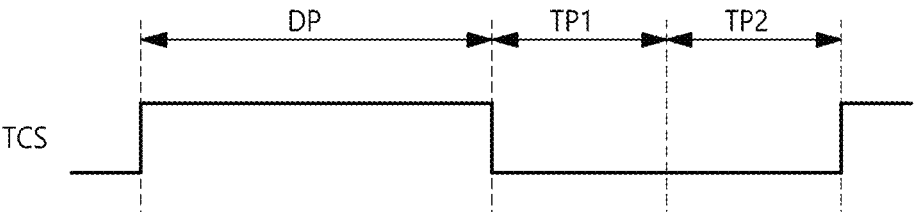
FIG. 11 is a driving timing diagram of a touch display device according to embodiments of the present disclosure.

FIG. 11 is a driving timing diagram of a touch display device 100 according to embodiments of the present disclosure.

Referring to FIG. 11, a driving period of the display panel 110 of the touch display device 100 according to the embodiments of the present disclosure may include a display driving period DP for displaying an image, a finger touch sensing period TP1 for sensing a finger touch by a finger, and a pen touch sensing period TP2 for sensing a pen touch by a pen 10.

As an example, one display frame period may include a display driving period DP, a finger touch sensing period TP1, and a pen touch sensing period TP2. In this case, the display driving period DP may be a period included in an active time, and the finger touch sensing period TP1 and the pen touch sensing period TP2 may be periods included in a vertical blank time.

As another example, one display frame period may include a plurality of display driving periods DP, a plurality of finger touch sensing periods TP1, and a plurality of pen touch sensing periods TP2.

The display driving period DP, the finger touch sensing period TP1, and the pen touch sensing period TP2 may be defined by a timing control signal TCS.

For example, the timing control signal TCS may include a low-level signal period and a high level signal period. The first level signal period may be a signal period in which the display driving period DP proceeds, and the second level signal period may be a signal period in which the finger touch sensing period TP1 and the pen touch sensing period TP2 proceed. As an example, as shown in FIG. 11, the first level signal period may be a high-level signal period, and the second level signal period may be a low-level signal period. As another example, the first level signal period may be a low-level signal period, and the second level signal period may be a high-level signal period.

A first section of the second level signal section may correspond to a finger touch sensing period TP1, and a second section following the first section of the second level signal section may be a signal section in which a pen touch sensing period TP2 is performed.

As an example, there may be performed in order of the display driving period DP, the finger touch sensing period TP1, and the pen touch sensing period TP2. As another example, there may be performed in order of the display driving period DP, the pen touch sensing period TP2, and the finger touch sensing period TP1.

The timing control signal TCS may be supplied to the touch driving circuit 160 by the touch controller 170 or the display controller 140. For example, the timing control signal TCS may be a vertical synchronization signal for defining a display frame period.

For example, in addition to the timing control signal TCS, an additional timing control signal may be further utilized to distinguish the finger touch sensing period TP1 and the pen touch sensing period TP2. The additional timing control signal may be supplied to the touch driving circuit 160 by the touch controller 170 or the display controller 140.

Hereinafter, it will be described a driving method for sensing a finger touch during the finger touch sensing period TP1 and a driving method for sensing a pen touch during the pen touch sensing period TP2. First, it will be described a touch driving circuit 160 for sensing a pen touch and a finger touch with reference to FIG. 12.

Figure 12:
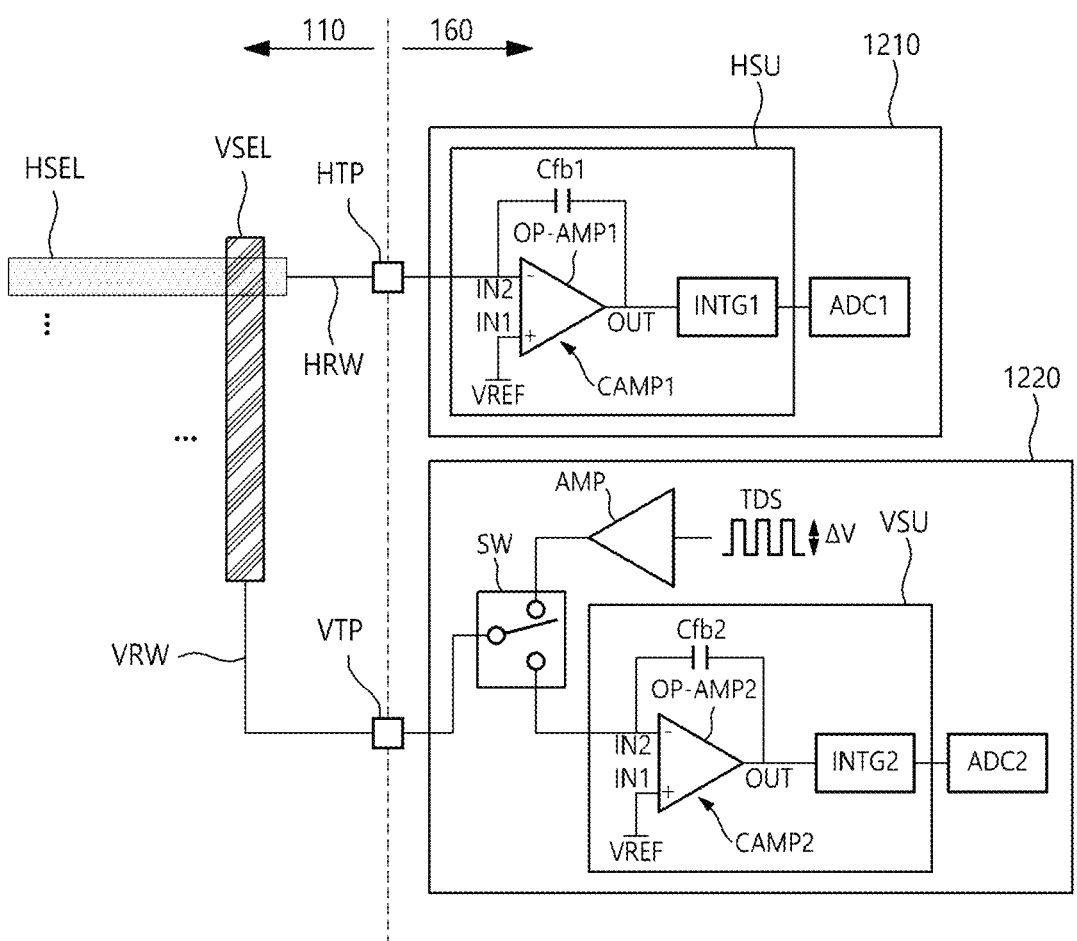
FIG. 12 illustrates a touch driving circuit according to embodiments of the present disclosure.

FIG. 12 illustrates a touch driving circuit 160 according to embodiments of the present disclosure.

Referring to FIG. 12, the touch driving circuit 160 according to the embodiments of the present disclosure may include a first driving circuit 1210 for driving a plurality of horizontal electrode lines HSEL, and a second driving circuit 1220 for driving a plurality of vertical electrode lines VSEL.

The first driving circuit 1210 may be connected to a plurality of horizontal touch pads HTP to which a plurality of horizontal routing wires HRW are respectively connected. The second driving circuit 1220 may be connected to a plurality of vertical touch pads VTP to which a plurality of vertical routing wires VRW are respectively connected.

For example, during the finger touch sensing period TP1, the touch display device 100 may sense a finger touch in a mutual-capacitance sensing method.

Accordingly, one of the plurality of horizontal electrode lines HSEL and the plurality of vertical electrode lines VSEL may be driving electrodes (or transmitting electrodes), and the rest may be sensing electrodes (or receiving electrodes). For example, the plurality of vertical electrode lines VSEL may be driving electrodes (or transmitting electrodes), and the plurality of horizontal electrode lines HSEL may be sensing electrodes (or receiving electrodes). For another example, the plurality of horizontal electrode lines HSEL may be driving electrodes (or transmitting electrodes), and the plurality of vertical electrode lines VSEL may be sensing electrodes (or receiving electrodes). Hereinafter, for convenience of explanation, it will be exemplified a case in which the plurality of vertical electrode lines VSEL are driving electrodes (or transmitting electrodes) and the plurality of horizontal electrode lines HSEL are sensing electrodes (or receiving electrodes).

During the finger touch sensing period TP1, the touch driving circuit 160 may supply a touch driving signal to at least one of the plurality of vertical electrode lines VSEL and sense at least one of the plurality of horizontal electrode lines HSEL.

For example, during the pen touch sensing period TP2, the touch display device 100 may sense the pen touch using an inductance sensing method.

During the pen touch sensing period TP2, the touch driving circuit 160 may sense at least one of the plurality of vertical electrode lines VSEL and the plurality of horizontal electrode lines HSEL.

During the pen touch sensing period TP2, the touch driving circuit 160 may sense a current flowing through at least one of the plurality of vertical electrode lines VSEL and the plurality of horizontal electrode lines HSEL.

A frequency of the current flowing through at least one of the plurality of vertical electrode lines VSEL and the plurality of horizontal electrode lines HSEL may correspond to a first frequency of a pen signal output from the pen 10.

Referring to FIG. 12, the first driving circuit 1210 may include two or more first sensing units HSU (e.g., circuits). The first sensing unit HSU may include a first charge amplifier CAMP1 and a first integrator INTG1, etc.

The first charge amplifier CAMP1 may include a first operational amplifier OP-AMP1 including a first input node IN1, a second input node IN2, and an output node OUT, and a first feedback capacitor Cfb1 connected between the second input node IN2 and the output node OUT. A reference voltage VREF in the form of a direct current (DC) voltage may be input to the first input node IN1. The second input node IN2 may be connected to a horizontal touch pad HTP.

The first integrator INTG1 may integrate a signal output to the output node OUT of the first charge amplifier CAMP1 and output an integral value.

The first driving circuit 1210 may further include a first analog-to-digital converter ADC1 for converting the integral value output from the first integrator INTG1 into a digital value.

The first driving circuit 1210 may further include a first front-end multiplexer circuit for selecting two or more of a plurality of horizontal electrode lines HSEL and connecting them to two or more first sensing units HSU.

The first driving circuit 1210 may further include a first back-end multiplexer circuit for selecting one of the two or more first sensing units HSU and connecting it to the first analog-to-digital converter ADC1.

Referring to FIG. 12, the second driving circuit 1220 may include two or more second sensing units VSU, two or more driving units, and two or more mode selection circuits SW. One of the two or more second sensing units VSU and one of the two or more driving units may be configured as a set. Each of the two or more mode selection circuits SW may select one of the second sensing units VSU and the driving units in the set and connect it to vertical touch pad VTP.

The mode selection circuit SW may connect the driving unit to the vertical touch pad VTP during the finger touch sensing period TP1. The mode selection circuit SW may connect the second sensing unit VSU to the vertical touch pad VTP during the pen touch sensing period TP2.

The driving unit may include an amplifier AMP, and the amplifier AMP may amplify and output an input touch driving signal TDS. An output terminal of the amplifier AMP may be connected to the vertical touch pad VTP through the mode selection circuit SW. Here, the touch driving signal TDS may be a signal whose voltage level varies. The touch driving signal TDS may have a predetermined frequency and a predetermined amplitude $\Delta V$. For example, the touch driving signal TDS may be a square wave, a triangle wave, or a sine wave.

The second sensing unit VSU may include a second charge amplifier CAMP2 and a second integrator INTG2, etc.

The second charge amplifier CAMP2 may include a second operational amplifier OP-AMP2 including a first input node IN1, a second input node IN2, and an output node OUT, and a second feedback capacitor Cfb2 connected between the second input node IN2 and the output node OUT. A reference voltage VREF in the form of a direct current (DC) voltage may be input to the first input node IN1. The second input node IN2 may be connected to a vertical touch pad VTP through a mode selection circuit SW.

The second integrator INTG2 may integrate the signal output from the output node OUT of the second charge amplifier CAMP2 and output an integral value.

The second driving circuit 1220 may further include a second analog-to-digital converter ADC2 that converts the integral value output from the second integrator INTG2 into a digital value.

The second driving circuit 1220 may further include a first front-end multiplexer circuit that selects two or more of the plurality of vertical electrode lines VSEL and connects them to two or more mode selection circuits SW.

The second driving circuit 1220 may further include a second back-end multiplexer circuit that selects one of the two or more second sensing units VSU and connects it to the second analog-to-digital converter ADC2.

As an example, as illustrated in FIG. 12, the first analog-to-digital converter ADC1 and the second analog-to-digital converter ADC2 may be provided separately.

As another example, the first analog-to-digital converter ADC1 may not be included in the first driving circuit 1210, the second analog-to-digital converter ADC2 may not be included in the second driving circuit 1220. In this case, there may be one analog-to-digital converter that exists outside the first driving circuit 1210 and the second driving circuit 1220 and is commonly connected to the first integrator INTG1 and the second integrator INTG2.

Figure 13:
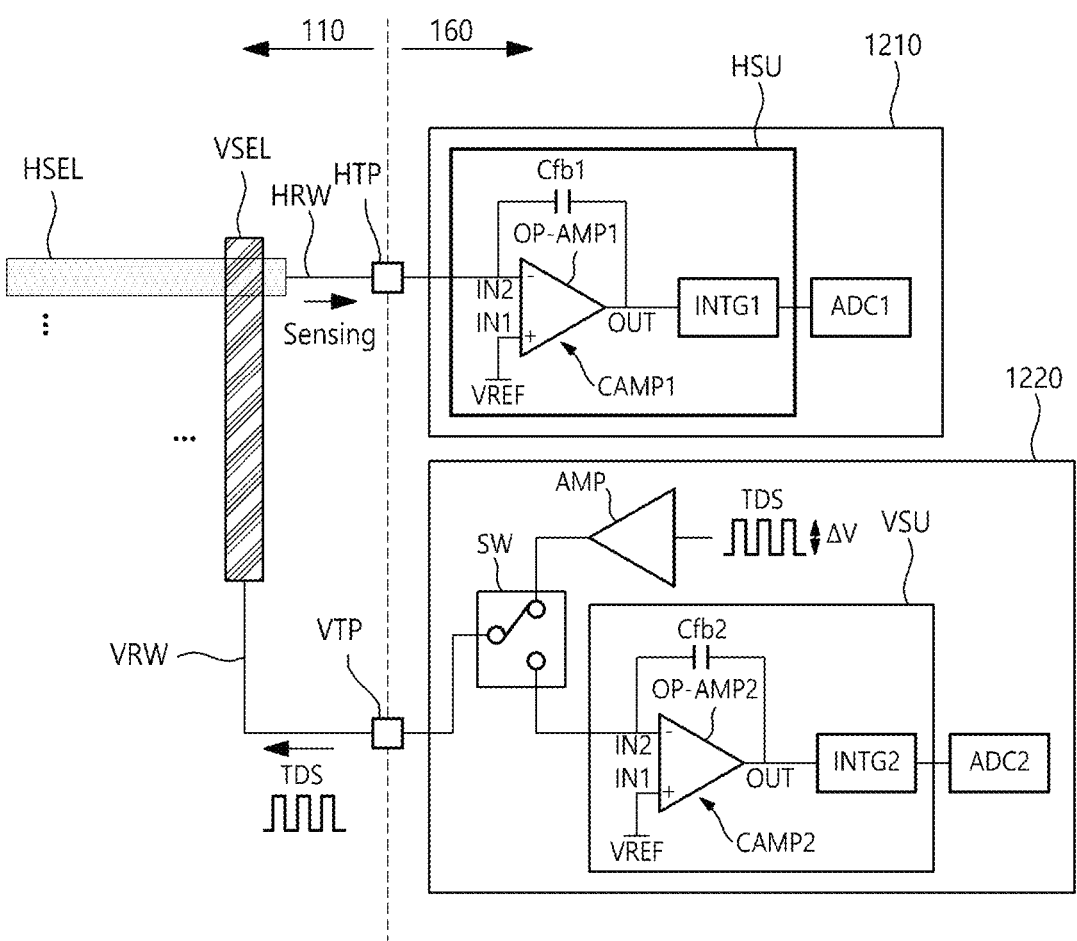
FIG. 13 illustrates a touch driving circuit during a finger touch sensing period of a touch display device according to embodiments of the present disclosure.

FIG. 13 illustrates a touch driving circuit 160 during a finger touch sensing period TP1 of a touch display device 100 according to embodiments of the present disclosure.

Referring to FIG. 13, during the finger touch sensing period TP1, the mode selection circuit SW in the second driving circuit 1220 of the touch driving circuit 160 may connect the driving unit among the driving unit and the second sensing unit VSU to the vertical touch pad VTP.

During the finger touch sensing period TP1, the amplifier AMP included in the driving unit of the second driving circuit 1220 in the touch driving circuit 160 may output the touch driving signal TDS to the vertical touch pad VTP. Accordingly, during the finger touch sensing period TP1, the touch driving signal TDS output from the touch driving circuit 160 may be applied to at least one of the plurality of vertical electrode lines VSEL. Here, the touch driving signal TDS may have a second frequency and a predetermined amplitude $\Delta V$.

As exemplified above, since the plurality of vertical electrode lines VSEL among the plurality of horizontal electrode lines HSEL and the plurality of vertical electrode lines VSEL serve as driving electrodes, the touch driving signal TDS may be applied to at least one of the plurality of vertical electrode lines VSEL. As another example, if the plurality of horizontal electrode lines HSEL serve as driving electrodes, the touch driving signal TDS may be applied to at least one of the plurality of horizontal electrode lines HSEL.

During the finger touch sensing period TP1, a capacitance (e.g., mutual capacitance) may be formed between at least one vertical electrode line VSEL to which the touch driving signal TDS is applied and the horizontal electrode lines HSEL around the at least one vertical electrode line VSEL.

The first sensing unit HSU of the first driving circuit 1210 in the touch driving circuit 160 may sense or detect a signal corresponding to the capacitance (e.g., mutual capacitance) formed on the horizontal electrode lines HSEL through the horizontal touch pads HTP connected to the horizontal routing wires HRW. The touch driving circuit 160 may generate sensing data corresponding to the sensing result of the first driving circuit 1210 through the first analog-to-digital converter ADC1 and transmit the generated sensing data to the touch controller 170.

The touch controller 170 may determine the presence or absence of a touch and/or the touch coordinates by identifying a change in the capacitance based on the sensing data.

Figure 14:
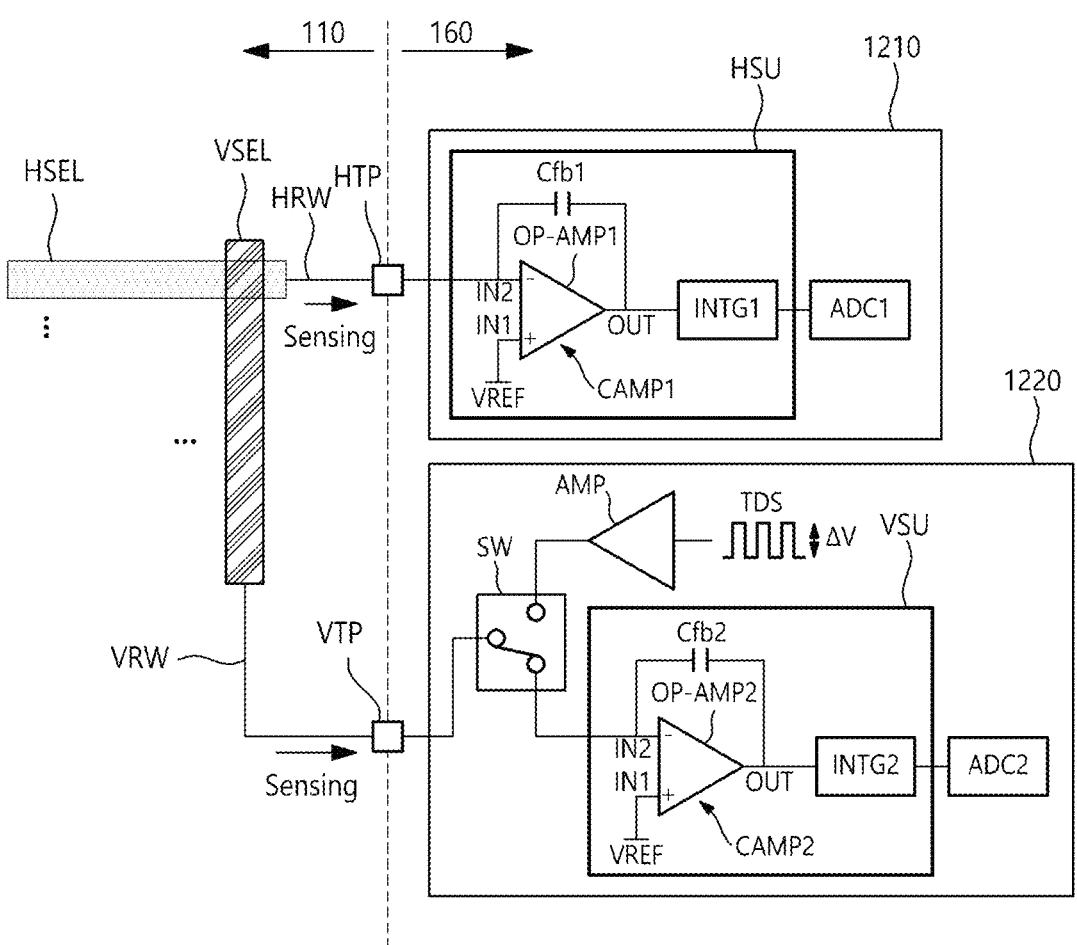
FIG. 14 illustrates a touch driving circuit during a pen touch sensing period of a touch display device according to embodiments of the present disclosure.

FIG. 14 illustrates a touch driving circuit 160 during a pen touch sensing period TP2 of a touch display device 100 according to embodiments of the present disclosure.

Referring to FIG. 14, during the pen touch sensing period TP2, the mode selection circuit SW in the second driving circuit 1220 of the touch driving circuit 160 may connect the second sensing unit VSU among the driving unit and the second sensing unit VSU to the vertical touch pad VTP.

Referring to FIG. 14, if a pen signal having a first frequency is output from a pen 10 that contacts or is close to the display panel 110, the pen signal may be input to at least one horizontal electrode line HSEL and/or at least one vertical electrode line VSEL located in the vicinity.

Accordingly, current may flow through at least one horizontal electrode line HSEL and/or at least one vertical electrode line VSEL. In this case, a current with a frequency corresponding to the first frequency of the pen signal may flow to at least one horizontal electrode line HSEL and/or at least one vertical electrode line VSEL. A signal (i.e., current signal) of a frequency different from the first frequency of the pen signal may be blocked by the touch sensor TS as a noise component. This noise blocking may be implemented due that the touch sensor TS may operate as a band pass filter passing only a specific frequency band including the first frequency of the pen signal.

Through the noise blocking described above, a signal (e.g., noise, coupling noise) of a frequency different from the first frequency of the pen signal may be not transmitted to the touch driving circuit 160 through the routing wires RW. Therefore, when detecting a signal (e.g., sensing processing) by the touch driving circuit 160, there may be detected a signal from which the noise component is removed, and touch sensing processing may be performed. Accordingly, touch sensing performance may be significantly improved.

During the pen touch sensing period TP2, the first sensing unit HSU in the first driving circuit 1210 may sense the corresponding horizontal electrode line HSEL, and the second sensing unit VSU in the second driving circuit 1220 may sense the corresponding vertical electrode line VSEL.

Two or more first sensing units HSU may sense the current flowing in each horizontal electrode line HSEL, and two or more second sensing units VSU may sense the current flowing in each vertical electrode line VSEL.

The touch driving circuit 160 may generate sensing data corresponding to the sensing results of the two or more first sensing units HSU and the sensing results of the two or more second sensing units VSU, and transmit the generated sensing data to the touch controller 170.

The touch controller 170 may determine the presence or absence of a pen touch and/or coordinates by identifying information on the amount of current flowing through each of the plurality of horizontal electrode lines HSEL and the plurality of vertical electrode lines VSEL based on the sensing data, and thereby may acquire information on the presence or absence of a pen touch by the pen 10 and/or coordinates.

Meanwhile, in order to increase the accuracy of pen touch sensing, an amplifier may be connected to the second input node IN2 of the first charge amplifier CAMP1 in the first sensing unit HSU. This amplifier may amplify the amount of current flowing through the horizontal routing wire HRW and input the amplified current to the second input node IN2 of the first charge amplifier CAMP1.

In addition, an amplifier may be connected to the second input node IN2 of the second charge amplifier CAMP2 in the second sensing unit VSU. This amplifier may amplify the magnitude or amplitude of the current flowing through the vertical routing wire VRW and input the amplified value to the second input node IN2 of the second charge amplifier CAMP2.

Meanwhile, the first sensing unit HSU and the second sensing unit VSU may also be implemented as current sensors.

Figure 15:
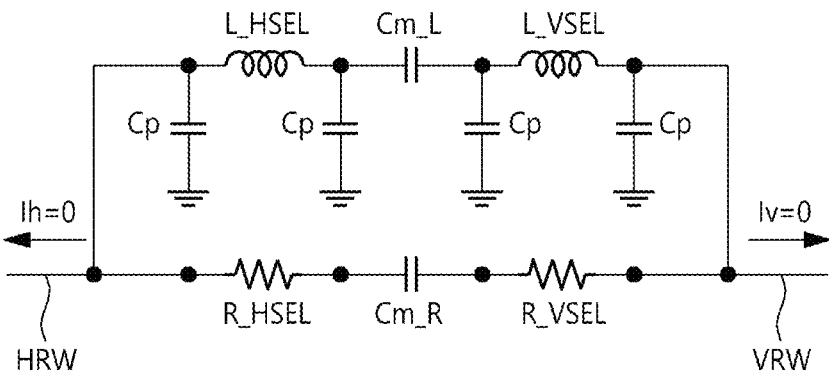
FIG. 15 illustrates an equivalent circuit of a coil-type touch sensor when there is no pen signal during a pen touch sensing period of a touch display device according to embodiments of the present disclosure.
Figure 16:
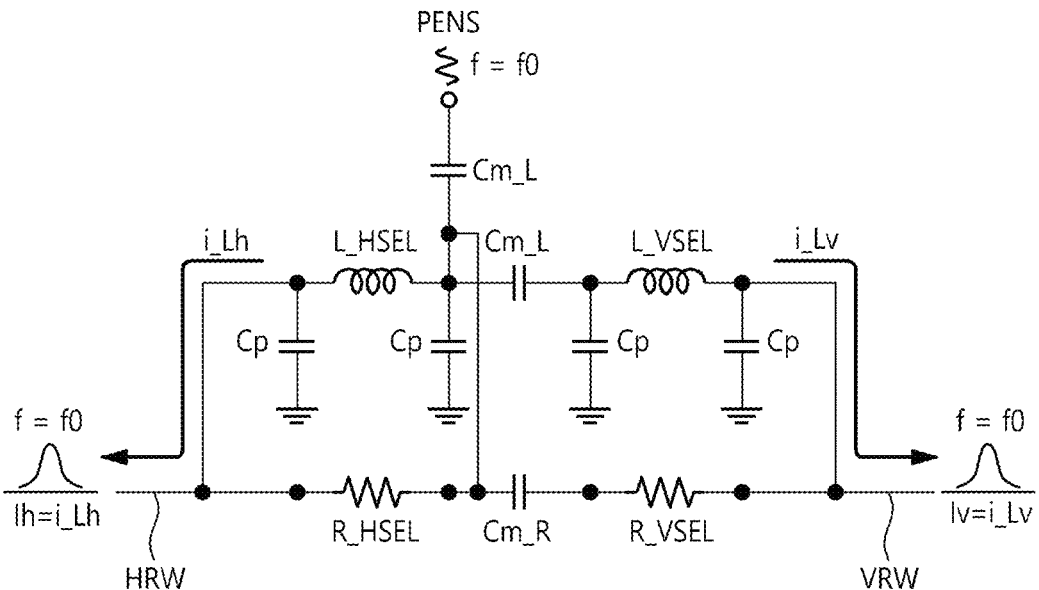
FIG. 16 illustrates an equivalent circuit of a coil-type touch sensor when there is a pen signal during a pen touch sensing period of a touch display device according to embodiments of the present disclosure.

FIG. 15 illustrates an equivalent circuit of a coil-type touch sensor TS when there is no pen signal during a pen touch sensing period TP2 of a touch display device 100 according to embodiments of the present disclosure, and FIG. 16 illustrates an equivalent circuit of a coil-type touch sensor TS when there is a pen signal during a pen touch sensing period TP2 of a touch display device 100 according to embodiments of the present disclosure.

Referring to FIGS. 15 and 16, the horizontal electrode line HSEL may have a coil shape, and thus may act as a first inductor L_HSEL. In addition, the horizontal electrode line HSEL has a resistance component, and thus may act as a first resistor R_HSEL.

The vertical electrode line VSEL has a coil shape, and thus may act as a second inductor L_VSEL. In addition, the vertical electrode line VSEL has a resistance component, and thus may act as a second resistor R_VSEL.

Referring to FIGS. 15 and 16, the horizontal electrode line HSEL and the vertical electrode line VSEL may be disposed on the encapsulation layer 200, and may form a parasitic capacitance Cp with the common electrode CE located below the encapsulation layer 200.

Referring to FIGS. 15 and 16, a mutual capacitance Cm_L may be formed between a horizontal electrode line HSEL operating as a first inductor L_HSEL and a vertical electrode line VSEL operating as a second inductor L_VSEL. A mutual capacitance Cm_R may be formed between a horizontal electrode line HSEL operating as a first resistor R_HSEL and a vertical electrode line VSEL operating as a second resistor R_VSEL.

Referring to FIGS. 15 and 16, the parasitic capacitances Cp formed across the first inductor L_HSEL, the first resistor R_HSEL and the first inductor L_HSEL, may form a first band-pass filter corresponding to the horizontal electrode line HSEL. The parasitic capacitances Cp formed across the second inductor L_VSEL, the second resistor R_VSEL and the second inductor L_VSEL may form a second band-pass filter corresponding to the vertical electrode line VSEL.

The first band-pass filter and the second band-pass filter may pass only a current signal i_Lh and i_Lv of a specific frequency band including the first frequency f0 of the pen signal PENS, and block the signal (e.g., noise) outside the specific frequency band.

Accordingly, the current Ih flowing in the horizontal routing wire HRW may be a current signal i_Lh of a specific frequency band including the first frequency f0. The current Iv flowing in the vertical routing wire VRW may be a current signal i_Lv of a specific frequency band including the first frequency f0.

The current (Ih) flowing in the horizontal routing wire HRW and the current Iv flowing in the vertical routing wire VRW may be input to the touch driving circuit 160.

Referring to FIG. 15, if the pen signal PENS is not input to the touch sensor TS, no current Ih flows in the horizontal routing wire HRW, and no current Iv flows in the vertical routing wire VRW (i.e., Ih=0, Iv=0).

Referring to FIG. 16, during the pen touch sensing period TP2, a pen signal PENS output from a pen 10 that is in contact with or close to the display panel 110 and having a first frequency f0 may be applied to at least one of the plurality of horizontal electrode lines HSEL and the plurality of vertical electrode lines VSEL.

Accordingly, when the pen signal PENS is input to the touch sensor TS, a current Ih may flow in the horizontal routing wire HRW, and a current Iv may flow in the vertical routing wire VRW.

The current Ih flowing in the horizontal routing wire HRW may correspond to a current signal i_Lh of a specific frequency band including the first frequency f0 (i.e., Ih=i_Lh). The current Iv flowing in the vertical routing wire VRW may correspond to a current signal i_Lv of a specific frequency band including the first frequency f0 (i.e., Iv=i_Lv).

That is, during the pen touch sensing period TP2, the current of the first frequency f0 may flow in at least one of the plurality of horizontal electrode lines HSEL and the plurality of vertical electrode lines VSEL. That is, during the pen touch sensing period TP2, a pen signal having the first frequency f0 may be input, and the current of the first frequency may flow in at least one of the plurality of vertical electrode lines VSEL and the plurality of horizontal electrode lines HSEL. During the pen touch sensing period TP2, currents of frequencies other than the first frequency f0 may be blocked by the touch sensor TS capable of operating as a band-pass filter.

During the pen touch sensing period TP2, the touch driving circuit 160 may determine the presence or absence of a pen touch by the pen 10 and/or the coordinates based on the amount of current flowing for each of the plurality of horizontal electrode lines HSEL and the plurality of vertical electrode lines VSEL.

Embodiments of the present disclosure described above are briefly described as follows.

A touch display device according to embodiments of the present disclosure may include a plurality of vertical electrode lines each extending in a column direction, a plurality of horizontal electrode lines each extending in a row direction, and a plurality of unit sensor areas where the plurality of vertical electrode lines and the plurality of horizontal electrode lines intersect.

According to the touch display device according to embodiments of the present disclosure, the plurality of unit sensor areas may include a first unit sensor area where a first vertical electrode line among the plurality of vertical electrode lines and a first horizontal electrode line among the plurality of horizontal electrode lines intersect.

According to the touch display device according to embodiments of the present disclosure, in the first unit sensor area, each of the first horizontal electrode line and the first vertical electrode line may have a coil shape.

According to the touch display device according to embodiments of the present disclosure, in the first unit sensor area, each of the first horizontal electrode line and the first vertical electrode line may have a coil shape on the same plane.

According to the touch display device according to embodiments of the present disclosure, in the first unit sensor area, the first vertical electrode line may be wound in a coil shape between a first vertical point and a second vertical point within the first unit sensor area, and the first horizontal electrode line may be wound in a coil shape between a first horizontal point and a second horizontal point within the first unit sensor area.

The touch display device according to embodiments of the present disclosure may further include a first vertical routing wire electrically connected to the first vertical electrode line, and a first horizontal routing wire electrically connected to the first horizontal electrode line.

According to the touch display device according to embodiments of the present disclosure, the first vertical point may correspond to a point where the first vertical electrode line and the first vertical routing wire are connected, or may be a point connected to a unit sensor area adjacent to the first unit sensor area in the column direction, or may be an edge of the first vertical electrode line. The second vertical point may correspond to a point connected to another unit sensor area adjacent to the first unit sensor area in the column direction.

According to the touch display device according to embodiments of the present disclosure, the first horizontal point may correspond to a point where the first horizontal electrode line and the first horizontal routing wire are connected, or may be a point connected to a unit sensor area adjacent to the first unit sensor area in the row direction, or may be an edge of the first horizontal electrode line. The second horizontal point may correspond to a point connected to another unit sensor area adjacent to the first unit sensor area in the row direction.

According to the touch display device according to embodiments of the present disclosure, in the first unit sensor area, the first vertical electrode line and the first horizontal electrode line may be interlocked with each other and wound in a coil shape.

According to the touch display device according to embodiments of the present disclosure, in the first unit sensor area, the first vertical electrode line may include a first vertical electrode extending from the first vertical point and having a coil shape, a second vertical electrode extending from the second vertical point and having a coil shape, and a bridge connecting the first vertical electrode and the second vertical electrode.

According to the touch display device according to embodiments of the present disclosure, in the first unit sensor area, the first horizontal electrode line may be wound together with the first vertical electrode on the same plane as the first vertical electrode, and the first horizontal electrode line may be wound together with the second vertical electrode on the same plane as the second vertical electrode.

According to the touch display device according to embodiments of the present disclosure, the first vertical electrode may include a first vertical coil portion and a second vertical coil portion, and the first vertical coil portion and the second vertical coil portion may be integrally formed, and may be portions extending and branching from the first vertical point.

According to the touch display device according to embodiments of the present disclosure, the second vertical electrode may include a third vertical coil portion and a fourth vertical coil portion, and the third vertical coil portion and the fourth vertical coil portion may be integrally formed, and may be portions extending and branching from the second vertical point.

According to the touch display device according to embodiments of the present disclosure, the first horizontal electrode line may include a first horizontal coil portion wound together with the first vertical coil portion, a second horizontal coil portion wound together with the second vertical coil portion, a third horizontal coil portion wound together with the third vertical coil portion, and a fourth horizontal coil portion wound together with the fourth vertical coil portion.

According to the touch display device according to embodiments of the present disclosure, the first horizontal coil portion, the second horizontal coil portion, the third horizontal coil portion, and the fourth horizontal coil portion may be integrally formed.

According to the touch display device according to embodiments of the present disclosure, the first horizontal coil portion and the third horizontal coil portion may be portions extending and branching from the first horizontal point, and the second horizontal coil portion and the fourth horizontal coil portion may be portions extending and branching from the second horizontal point.

According to the touch display device according to embodiments of the present disclosure, a coil shape of the first vertical coil portion and a coil shape of the second vertical coil portion may be symmetrical to each other. In addition, a coil shape of the third vertical coil portion and a coil shape of the fourth vertical coil portion may be symmetrical to each other.

According to the touch display device according to embodiments of the present disclosure, the coil shape of the first vertical coil portion and the coil shape of the third vertical coil portion may be symmetrical to each other, and the coil shape of the second vertical coil portion and the coil shape of the fourth vertical coil portion may be symmetrical to each other.

According to the touch display device according to embodiments of the present disclosure, a coil shape of the first horizontal coil portion and a coil shape of the second horizontal coil portion may be symmetrical to each other, and a coil shape of the third horizontal coil portion and a coil shape of the fourth horizontal coil portion may be symmetrical to each other. In addition, the coil shape of the first horizontal coil portion and the coil shape of the third horizontal coil portion may be symmetrical to each other, and the coil shape of the second horizontal coil portion and the coil shape of the fourth horizontal coil portion may be symmetrical to each other.

According to the touch display device according to embodiments of the present disclosure, in the first unit sensor area, the first vertical electrode line may further include a first vertical auxiliary electrode disposed between the first vertical electrode and the first horizontal electrode line and electrically connected to the first vertical electrode, and a second vertical auxiliary electrode disposed between the second vertical electrode and the first horizontal electrode line and electrically connected to the second vertical electrode.

According to the touch display device according to embodiments of the present disclosure, in the first unit sensor area, the first horizontal electrode line may include a first horizontal auxiliary electrode disposed between the first horizontal electrode line and the first vertical electrode and electrically connected to the first horizontal electrode line.

According to the touch display device according to embodiments of the present disclosure, each of the plurality of vertical electrode lines may include a plurality of vertical electrodes, and a bridge electrically connecting two adjacent vertical electrodes among the plurality of vertical electrodes. The bridge may overlap with one of the plurality of horizontal electrode lines.

The touch display device according to embodiments of the present disclosure may further include a first metal layer, an insulating layer on the first metal layer, and a second metal layer on the insulating layer.

According to the touch display device according to embodiments of the present disclosure, for example, the bridge may be disposed within the first metal layer, each of the plurality of vertical electrodes may be disposed within the second metal layer, each of the plurality of horizontal electrode lines may be disposed within the second metal layer, and the two adjacent vertical electrodes may be electrically connected to the bridge through a hole of the insulating layer.

According to the touch display device according to embodiments of the present disclosure, as another example, the bridge may be disposed within the first metal layer, and each of the plurality of vertical electrodes may include a first metal vertical electrode disposed in the first metal layer and a second metal vertical electrode disposed in the second metal layer. In addition, the second metal vertical electrode may be electrically connected to the first metal vertical electrode through a hole in the insulating layer. Each of the plurality of horizontal electrode lines may include a first metal horizontal electrode line disposed in the first metal layer and a second metal horizontal electrode line disposed in the second metal layer. The second metal horizontal electrode line may be electrically connected to the first metal horizontal electrode line through another hole in the insulating layer. A second metal vertical electrode included in each of the two adjacent vertical electrodes may be electrically connected to the bridge through another hole in the insulating layer.

The touch display device according to embodiments of the present disclosure may further include a plurality of horizontal routing wires and a plurality of vertical routing wires electrically connected to the plurality of horizontal electrode lines and the plurality of vertical electrode lines, respectively.

The touch display device according to embodiments of the present disclosure may further include a plurality of light emitting devices, and an encapsulation layer disposed on the plurality of light emitting devices and having an inclined surface.

According to the touch display device according to embodiments of the present disclosure, the plurality of horizontal electrode lines and the plurality of vertical electrode lines may be disposed on the encapsulation layer, and the plurality of horizontal routing wires and the plurality of vertical routing wires may be disposed along the inclined surface.

The touch display device according to embodiments of the present disclosure may further include a display panel including a plurality of subpixels, and a touch driving circuit connected to the display panel.

According to the touch display device according to embodiments of the present disclosure, the display panel may include the plurality of horizontal electrode lines and the plurality of vertical electrode lines.

According to the touch display device according to embodiments of the present disclosure, during a pen touch sensing period, a pen signal having a first frequency and output from a pen which contacts or is close to the display panel may be applied to at least one of the plurality of horizontal electrode lines and the plurality of vertical electrode lines.

According to the touch display device according to embodiments of the present disclosure, during the pen touch sensing period, a current of the first frequency may flow through at least one of the plurality of horizontal electrode lines and the plurality of vertical electrode lines.

According to the touch display device according to embodiments of the present disclosure, during the pen touch sensing period, the touch driving circuit may acquire a coordinate of a pen touch by the pen based on the amount of current flowing for each of the plurality of horizontal electrode lines and the plurality of vertical electrode lines.

According to the touch display device according to embodiments of the present disclosure, during a finger touch sensing period, a touch driving signal output from the touch driving circuit and having a second frequency may be applied to at least one of the plurality of horizontal electrode lines or to at least one of the plurality of vertical electrode lines.

A touch sensor according to embodiments of the present disclosure may include a plurality of first electrode lines each extending in a first direction and having a coil shape, and a plurality of second electrode lines each extending in a second direction different from the first direction and having a coil shape.

According to the touch sensor according to embodiments of the present disclosure, the plurality of first electrode lines and the plurality of second electrode lines may be interlocked with each other on the same plane and wound in a coil shape.

According to the touch sensor according to embodiments of the present disclosure, when a pen signal having a first frequency is input, a current having the first frequency may flow through at least one of the plurality of first electrode lines and the plurality of second electrode lines.

According to the touch sensor according to embodiments of the present disclosure, a signal (e.g., current or current signal) with a frequency different from the first frequency may be blocked by the touch sensor.

According to embodiments of the present disclosure, it is possible to provide a touch sensor and a touch display device with a structure capable of reducing coupling noise with other surrounding electrodes.

According to embodiments of the present disclosure, it is possible to provide a touch sensor and a touch display device with a structure capable of improving touch sensing performance.

According to embodiments of the present disclosure, it is possible to provide a touch sensor and a touch display device with a coil-type structure capable of sensing pen touch based on inductance.

According to embodiments of the present disclosure, it is possible to provide a touch sensor and a touch display device capable of blocking a noise on its own.

According to embodiments of the present disclosure, it is possible to provide a touch sensor and a touch display device with a structure enabling both capacitance-based finger touch sensing and inductance-based pen touch sensing. Accordingly, it is possible to reduce the weight of the touch display device since there is no need to separately provide a touch sensor for finger touch sensing and a touch sensor for pen touch sensing.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

What is claimed is:

1. A touch display device comprising:
a plurality of vertical electrode lines each extending in a column direction;
a plurality of horizontal electrode lines each extending in a row direction; and
a plurality of unit sensor areas where the plurality of vertical electrode lines and the plurality of horizontal electrode lines intersect,
wherein a vertical electrode line in each of the plurality of unit sensor areas has a complex spiral structure, in which two pairs of vertical coil electrodes, extending spirally from both sides of a central segment of the plurality of vertical electrode lines, are interconnected by a bridge, and
wherein, in each of the plurality of unit sensor areas, a portion of the vertical electrode line and a portion of a horizontal electrode line of the plurality of horizontal electrode lines are configured to generate a touch sensing signal based on a capacitive change caused by a finger touch, a stylus touch, or a pen touch.

2. The touch display device of claim 1, wherein the complex spiral structure of the vertical electrode line includes at least one curved segment repeatedly bent within each of the plurality of unit sensor areas.

3. The touch display device of claim 1, wherein the complex spiral structure is configured such that an effective electrode length within each of the plurality of unit sensor areas is increased compared to a straight-line electrode structure.

4. The touch display device of claim 1, wherein the plurality of vertical electrode lines and the plurality of horizontal electrode lines are disposed to interlock with each other on a same plane, and
wherein at least one of the plurality of vertical electrode lines is wound into a coil shape.

5. The touch display device of claim 4, wherein a spiral portion of the vertical electrode line and a spiral portion of the horizontal electrode line are interlocked with each other within each of the plurality of unit sensor areas without overlapping.

6. The touch display device of claim 1, wherein, in each of the plurality of unit sensor areas, a spiral structure of the vertical electrode line and a corresponding portion of the horizontal electrode line cooperatively define a substantially closed boundary.

7. The touch display device of claim 1, wherein each of the plurality of vertical electrode lines includes a first vertical coil portion and a second vertical coil portion integrally formed and branching from a first vertical branching point, wherein a third vertical coil portion and a fourth vertical coil portion are integrally formed and branch from a second vertical branching point, wherein the first vertical coil portion, the second vertical coil portion, the third vertical coil portion, and the fourth vertical coil portion extend spirally within a unit sensor area of the plurality of unit sensor areas and are interconnected by the bridge to form the complex spiral structure, and wherein the horizontal electrode line includes a plurality of horizontal coil portions each wound together with a corresponding one of the first vertical coil portion, the second vertical coil portion, the third vertical coil portion, and the fourth vertical coil portion.

8. The touch display device of claim 7, wherein a coil shape of the first vertical coil portion and a coil shape of the second vertical coil portion are symmetrical to each other, and a coil shape of the third vertical coil portion and a coil shape of the fourth vertical coil portion are symmetrical to each other, and wherein the coil shape of the first vertical coil portion and the coil shape of the third vertical coil portion are symmetrical to each other, and the coil shape of the second vertical coil portion and the coil shape of the fourth vertical coil portion are symmetrical to each other.

9. The touch display device of claim 1, wherein, in each of the plurality of unit sensor areas, the vertical electrode line further includes:

at least one vertical auxiliary electrode disposed between the vertical electrode line and the horizontal electrode line and electrically connected to the vertical electrode line; and wherein, in each of the plurality of unit sensor areas, the horizontal electrode line includes at least one auxiliary electrode disposed between the first-horizontal electrode line and the vertical electrode line and electrically connected to the horizontal electrode line.

10. The touch display device of claim 1, wherein each of the plurality of vertical electrode lines includes a plurality of vertical electrodes, and the bridge electrically connecting two adjacent vertical electrodes among the plurality of vertical electrodes, and wherein the bridge overlaps with one of the plurality of horizontal electrode lines without an electrical contact with one of the plurality of horizontal electrode lines.

11. The touch display device of claim 10, wherein the plurality of vertical electrode lines and the plurality of horizontal electrode lines are formed of a transparent conductive material that includes at least one of indium tin oxide, metal mesh, or silver nanowire.

12. The touch display device of claim 10, further comprising:

a first metal layer;

an insulating layer on the first metal layer; and a second metal layer on the insulating layer, wherein the bridge is within the first metal layer, wherein each of the plurality of vertical electrodes includes a first metal vertical electrode in the first metal layer and a second metal vertical electrode in the second metal layer, and the second metal vertical electrode is electrically connected to the first metal vertical electrode through a hole in the insulating layer, wherein each of the plurality of horizontal electrode lines includes a first metal horizontal electrode line in the first metal layer and a second metal horizontal electrode line in the second metal layer, and the second metal horizontal electrode line is electrically connected to the first metal horizontal electrode line through another hole in the insulating layer, and wherein a second metal vertical electrode included in each of the two adjacent vertical electrodes is electrically connected to the bridge through another hole in the insulating layer.

13. The touch display device of claim 1, further comprising:

a plurality of horizontal routing wires and a plurality of vertical routing wires electrically connected to the plurality of horizontal electrode lines and the plurality of vertical electrode lines, respectively;

a plurality of light emitting devices; and an encapsulation layer on the plurality of light emitting devices, the encapsulation layer having an inclined surface, wherein the plurality of horizontal electrode lines and the plurality of vertical electrode lines are on the encapsulation layer, wherein the plurality of horizontal routing wires and the plurality of vertical routing wires are along the inclined surface.

14. The touch display device of claim 1, further comprising:

a display panel including a plurality of subpixels; and a touch driving circuit connected to the display panel, wherein the display panel includes the plurality of horizontal electrode lines and the plurality of vertical electrode lines, wherein, during a pen touch sensing period, a pen signal having a first frequency and output from a pen is applied to at least one of the plurality of horizontal electrode lines and the plurality of vertical electrode lines.

15. The touch display device of claim 14, wherein, during the pen touch sensing period, a current of the first frequency flows through at least one of the plurality of horizontal electrode lines and the plurality of vertical electrode lines, and wherein, during the pen touch sensing period, the touch driving circuit acquires a coordinate of a pen touch by the pen based on an amount of current flowing for each of the plurality of horizontal electrode lines and the plurality of vertical electrode lines.

16. The touch display device of claim 14, wherein, during a finger touch sensing period, a touch driving signal output from the touch driving circuit and having a second frequency is applied to at least one of the plurality of horizontal electrode lines or to at least one of the plurality of vertical electrode lines.

17. A touch sensor comprising:

a plurality of first electrode lines each extending in a first direction; and a plurality of second electrode lines each extending in a second direction different from the first direction, wherein a unit sensor area of a plurality of unit sensor areas is defined at an intersection region where one of the plurality of first electrode lines crosses one of the plurality of second electrode lines, wherein a first electrode line of the plurality of first electrode lines in each of the plurality of unit sensor areas has a complex spiral structure, in which two pairs of coil electrodes, extending spirally from both sides of the first electrode line, are interconnected by a bridge, wherein, in each of the plurality of unit sensor areas, a portion of the first electrode line and a portion of a second electrode line of the plurality of second electrode lines are arranged to be interdigitated with each other, and wherein the first electrode line and the second electrode line are configured to detect a touch input based on a capacitive change caused by a finger touch, a stylus touch, or a pen touch.

18. The touch sensor of claim 17, wherein, when a pen signal having a first frequency is input, a current having the first frequency flows through at least one of the plurality of first electrode lines and the plurality of second electrode lines.

19. The touch sensor of claim 18, wherein a signal with a frequency that is different from the first frequency is blocked by the touch sensor.

20. The touch sensor of claim 17, wherein the plurality of first electrode lines and the plurality of second electrode lines are configured such that a capacitance change generated by a pen input is greater than a capacitance change generated by a finger input.

* * * * *